United States Patent [19]
Hoffland et al.

[11] Patent Number: 6,054,044
[45] Date of Patent: Apr. 25, 2000

[54] APPARATUS AND METHODS FOR WASTEWATER TREATMENT FROM HIGH VOLUME LIVESTOCK PRODUCTION

[75] Inventors: Robert O. Hoffland, Conroe, Tex.; Jim Austin, Troutville, Va.

[73] Assignee: Hoffland Environmental, Inc., Conroe, Tex.

[21] Appl. No.: 08/879,008

[22] Filed: Jun. 19, 1997

[51] Int. Cl.⁷ .............................. B01D 17/12; C02F 3/30
[52] U.S. Cl. ................... 210/96.1; 210/139; 210/195.1; 210/202; 210/605; 210/614; 210/621
[58] Field of Search .................... 210/602, 605, 210/610, 614, 621, 622, 629, 630, 739, 805, 806, 151, 195.1, 202, 259, 96.1, 139, 150

[56] References Cited

U.S. PATENT DOCUMENTS

| | | | |
|---|---|---|---|
| 4,122,013 | 10/1978 | Greenleaf, Jr. et al. | 210/195 |
| 4,267,038 | 5/1981 | Thompson | 210/602 |
| 4,443,337 | 4/1984 | Otani et al. | 210/602 |
| 4,468,463 | 8/1984 | Arsovic | 435/316 |
| 4,643,830 | 2/1987 | Reid | 210/629 |
| 4,824,563 | 4/1989 | Iwahori et al. | 210/195.1 |
| 4,999,111 | 3/1991 | Williamson | 210/605 |
| 5,013,441 | 5/1991 | Goronszy | 210/605 |
| 5,472,472 | 12/1995 | Northrop | 71/9 |
| 5,500,119 | 3/1996 | Jenelle | 210/615 |
| 5,538,529 | 7/1996 | Northrop | 71/9 |
| 5,545,325 | 8/1996 | Hsu et al. | 210/605 |
| 5,651,891 | 7/1997 | Molof et al. | 210/605 |

OTHER PUBLICATIONS

George Tchnobanoglous and Franklin L. Burton; Wastewater Engineering Treatment, Disposal, and Reuse, Metcalf & Eddy, Inc., 1991, McGraw–Hill, Inc., pp. 714–715, 728–737.

EIMCO Process Equipment Company Brochure: EIMCO Bardenpho Process, Biological Nutrient Removal System, 1984.

*Primary Examiner*—Joseph W. Drodge
*Attorney, Agent, or Firm*—Matthews, Joseph, Shaddox & Masun

[57] ABSTRACT

An system for treating livestock wastewater to provide treated water suitable for exposure to livestock and crop irrigation. The system provides an anoxic culture, an anaerobic culture, and an aerobic culture, to which wastewater is exposed sequentially. Also provided is return of water from the aerobic culture to the anoxic culture for further treatment. The aerobic culture may be provided such that conditions cycle from aerobic to anoxic. Clarified, treated water results, wherein the resulting water is suitable for exposure to livestock, such as for flushing livestock waste. The resulting water is also suitable for crop irrigation.

12 Claims, 9 Drawing Sheets

APPARATUS AND METHODS FOR WASTEWATER TREATMENT FROM HIGH VOLUME LIVESTOCK PRODUCTION

FIELD OF THE INVENTION

The present invention relates to an apparatus and method for treating agricultural or industrial wastewater and more particularly to a combination of anoxic, anaerobic, and aerobic cultures to treat any wastewater without the use of chemical precipitants or complicated recycling through the biological cultures.

BACKGROUND OF THE INVENTION

When wild hogs roamed the forest in sparse numbers with the population determined by the available food sources, the environmental impact of the hog excretion was insignificant. The individual animal roamed freely, spreading his waste over large areas as he traveled. Later, when man domesticated hog and other livestock, and increased the local concentration to correspond to the caretakers food production, the environmental impact of waste was at first minimal. The farmer removed the waste manure from the pig sty and spread it over his farm for fertilizer.

In recent times, however, livestock production density has dramatically increased. For example, the speciality hog production operators purchased their hog feed (cereal grains) from other farmers who specialized in the production of grain cereal. This enables one operator to have the hog production facility of 100,000 head of hogs or more. The production of hog manure now becomes a problem. The spreading of large quantities of hog manure on land requires an extensive amount of land. The soil has a finite capacity to degrade animal feces, and when exceeded it becomes the equivalent of a pile of manure.

In addition to the practical limits of the distribution of animal feces, regulatory agencies have applied limits to the amount of animal feces per acre to be approximately equivalent to the plant uptake of the non-biodegradable components. The regulations were created to prohibit the surface run-off from storm water and the excess percolation of the soluble waste components into the ground water.

In recent times, livestock producers have elected to create pits or lagoons for the collection of the waste. In the barns or houses, the animals live on elevated flooring which permits the feces to drop through the floor to a sub-floor. This sub-floor is periodically flushed to remove the feces and maintain a healthy living environment. The feces with the wash down water as a vehicle flow to the storage lagoon.

A properly operated lagoon will biologically decompose a significant amount of the animal waste. However, large amount production operations require proportionately large lagoons and therefore a significant amount of land is consumed. Also, the two major components of animal waste that are regulated, mainly nitrogen and phosphorous, are not significantly removed by a stagnant lagoon or pond.

When the lagoon-treated waste is applied to the crop land it contains high levels of nitrogen and phosphorous. The regulatory limit for the land application of nitrogen is proportionate to the amount of nitrogen consumed by the crop produced. The regulatory level of nitrogen consumed by hay is approximately two (2) times the amount of corn and four (4) times the level for cotton (hay—250 lbs/acre of nitrogen, corn—100 lbs/acre of nitrogen, cotton—60 lbs/acre of nitrogen). In most areas hay has very little resale value and is not an economically advantageous crop to produce. Corn is near break even. Cotton, however is an economical cash crop and hence the most desirable to the farmers. The disadvantage is that the amount of land required to properly apply the waste nitrogen is four (4) times the level of hay. Hence, if the farmers can reduce the levels of nitrogen in the irrigation water, he can economically produce cotton.

With a low nitrogen concentration, the farmer may apply a much larger volume of water per acre without exceeding the maximum nutrient level. In some cases the quantity of water may be increased by a factor of 40 times. This dramatically reduces the labor required to move and maintain the sprinkler irrigation system.

The water utilized to flush the livestock production floor and move the freshly produced feces to the lagoon is usually recycled from the pond. Recycling the wastewater provides two advantages to the producer. First, it reduces that amount of fresh water that must be provided and secondly since it is recycled from the pond, the size of the pond can be significantly smaller.

The problem with the recycled water is that it contains high level of ammonia (breakdown product of the waste urea) and odors which are not beneficial to the health of the livestock. High levels of ammonia in the flush water require the building to be vented to reduce the ambient levels of ammonia. Increased ventilation lowers the ambient temperatures in the winter, lowers the rate of weight gain of the animal, and increases the food input of the animal to maintain body temperature.

The wastewater treatment facility of the present invention is simple. It does not require any chemicals to precipitate soluble nitrogen and organic compounds. There is no skimming of the bio-cultures required to maintain biological activity. The wastewater treatment facility of the present invention includes biological cultures of anoxic, anaerobic and aerobic conditions.

Biological cultures purify water by exploiting the metabolic processes of various bacterial and algal species to convert organic and inorganic waste products into benign end products, typically carbon dioxide and more cells. Intermediate products formed by biological processes, however, can include methane and sulfur gases or other volatile or odiferous products, depending on the nature of the culture and the waste material being digested. Biological cultures can be fostered of desirable microorganisms which provide the functional basis for the wastewater treatment by metabolically converting the waste products. Cultures of undesirable microorganisms which produce undesirable tastes, odors, growths, or which are actually toxic are also possible, however, and it is important in biological wastewater treatment that cultures of suitable microorganisms be fostered and that undesirable cultures be avoided.

The organic material in the wastewater serves both as an energy source and a source of carbon for cell synthesis by the microorganisms of the culture. Microorganisms are both reactants and products in the biological treatment of wastewater. Typical configurations of biological reactor cultures for purifying water include suspended-culture processes and attached growth systems such as film-flow reactors. Suspended cultures include activated sludge (flocculent cultures), aerated lagoons, oxidation ponds, and anaerobic cultures.

Biological digestion of organic waste material is affected by the oxygen level present in the culture because the oxygen level determines the metabolic pathway available to the microorganism. Aerobic conditions provide plenty of oxygen to the culture, and fosters the growth of microorganisms that can use the exogenous oxygen as a terminal electron acceptor in the oxidation of organic acids generated from the metabolic breakdown of organic material. If insufficient exogenous oxygen is available to the culture, the conditions are anaerobic. Under anaerobic conditions, the absence of oxygen as a terminal electron acceptor results in the excretion of organic acids into the culture medium as waste. The accumulation of acids in the culture medium can rise to toxic levels for the organisms if the pH of the culture is not regulated by some method of acid oxidation such as methane fermentation. Many types of bacteria, called facultative bacteria, can live under both aerobic and anaerobic conditions.

Anoxic conditions exist where essentially no oxygen is available to the culture. Under anoxic conditions, the growth of microorganisms is fostered that can utilize nitrogen as an electron acceptor in the absence of oxygen. Anoxic cultures convert nitrate nitrogen into nitrogen gas in a process called anaerobic denitrification. Two classifications of nitrifying microorganisms have been identified. Nitrosomonas bacteria oxidize ammonia nitrogen to nitrite. Nitrobacter bacteria oxidize nitrite to nitrate. Both groups are chemoautotrophs.

In addition to organic material, wastewater also contains inorganic matter to be removed. The inorganic components of wastewater of principal concern to the present invention include nitrogen, phosphorous, and sulfur. Nitrogen can be removed by biological cultures under anoxic conditions as described above. Phosphorous is necessary for the growth of algae and bacteria, and is primarily removed from wastewater by incorporation into the cells of growing cultures, although care may be necessary to avoid undesirable noxious algal blooms in the presence of excess phosphorous. Phosphorous may also be removed by chemical precipitation whereby soluble phosphorous is incorporated into an insoluble complex and allowed to settle as solid sediment. The present invention does not utilize chemical precipitation.

Sulfur, in the form of sulfate ion, occurs naturally in most water supplies and is common in wastewater as well. Sulfur is required for protein synthesis and is released by protein degradation. Under anaerobic conditions, sulfates are reduced to sulfites and hydrogen sulfide by anaerobic bacteria. Hydrogen sulfide can even be biologically oxidized to sulfuric acid.

The primary activity of biological cultures in the treatment of wastewater is the bio-removal of organic material. To measure the effectiveness of the treatment, it is necessary to estimate the amount of organic waste susceptible to biological removal. The total organic content of wastewater can be estimated by measuring the amount of oxygen required for chemical conversion of all the organic material into carbon dioxide and water. This is referred to as the Chemical Oxygen Demand (COD). Another measure is the Total Organic Carbon (TOC), which measures the carbon dioxide produced by combustion. The portion of the total organics susceptible to bio-conversion is referred to as Biological oxygen Demand (BOD). BOD can be measured by direct measurement of the oxygen uptake due to the biological action on the organic material the wastewater, or by calculating the change in the amount of organic material as measured by COD or TOC due to biological activity. BOD is known to those skilled in the art as an important measure of effluent quality.

The cell mass concentration of a biological culture is referred to as mixed-liquor suspended-solids (MLSS). It is known to those of ordinary skill in the art that biological water treatment cultures comprise a mixture of a variety of microorganisms. Although the culture conditions are established to foster a particular biological process, no culture in the field is perfectly homogenous with regard to the population of microorganisms inhabiting the culture. As a result, different processes are occurring in different areas of any given culture, even though one particular process is dominant. For example, an aerobic culture may utilize bubblers to supply exogenous oxygen to the facultative microorganisms in the culture, but the oxygen so supplied may not be uniformly available throughout the culture so that zones of reduced oxygenation may exist, between the bubblers, for instance, creating an anaerobic or even anoxic subzone within the primary culture. The present invention takes advantage of this characteristic of biological cultures to provide thorough processing of the waste material in the treated water.

While others have proposed methods for the treatment of agricultural wastewater using biological cultures, the present invention does not require the use of chemicals to precipitate solids from the wastewater, nor does it require the use of skimmers, geo-reactors, or other additional steps or processes.

For example, in U.S. Pat. No. 5,545,325 a facility for combined aerobic and anaerobic treatment of livestock wastewater is disclosed. This is accomplished with a natural solid-liquid separation device comprising a digester with an automatic skimmer installed at the upper part of the digester, and a level sensing control valve to control the volume of wastewater in the digester.

In U.S. Pat. No. 5,480,548 a wastewater purification process is disclosed including directing the wastewater through at least one aerobic zone and at least one anaerobic zone in repeating or alternating segments. A portion of effluent from the one or more anoxic zones are fed through at least one aerobic zone to which wastewater is fed and returned to the upstream portion of the anoxic zone.

In U.S. Pat. No. 5,472,472 a process for the bio-conversion of soluble and suspended organics from animal waste is disclosed wherein the wastewater is treated through a series of eco-reactors and bio-reactors, including aerobic and anaerobic treatment. Soluble phosphorus is precipitated with metallic salts.

In U.S. Pat. No. 4,824,563 a method of treating high concentration organic wastewater in dependence upon micro-organisms is disclosed. The method includes an anaerobic operation tank, an aerobic tank, and an ozone treatment tank.

In U.S. Pat. No. 4,999,111 a process for treating wastewater is disclosed including aerobic, anaerobic, and anoxic treatment. The process of the '111 patent includes splitting the stream of wastewater into a main stream and a side stream wherein the anoxic treatment takes place in the side stream. Activated sludge is generated in the side stream and is recycled to the main stream treatment process that includes at least one aerobic treatment zone.

The present invention addresses problems associated with the treatment of wastewater, and particularly wastewater having a high level of organic material such as, for example, wastewater from high volume livestock production, with an apparatus to produce treated water suitable for irrigation, a portion of which may be recycled to the livestock production site for flushing waste.

Thus it is an object of the invention to provide a facility for removing solid residues from wastewater and to reclaim the solids for the food value therein.

It is another object to essentially remove the soluble organic components from industrial and agricultural wastewater.

It is another object to remove ammonia and urea from the recycle water being pumped to a livestock house for floor flushing, contributing to better health for the livestock occupying the livestock house.

It is another object of the invention to significantly reduce the total nitrogen in the treated wastewater being used for irrigating enabling the production of more economical cash crops.

It is another object of the invention to remove the soluble phosphorus from the irrigation water, when required.

It is another object of the invention to provide a wastewater treatment apparatus that is more efficient, requiring less land than is currently practiced.

It is another object of the invention to provide a facility for the treatment of agricultural or industrial wastewater that may utilize either lagoons or above surface basins or tanks.

It is another object of the invention to provide a method and apparatus to treat animal waste from high volume livestock production so that said waste is disposed of in an ecologically benign fashion.

It is another object of the invention to provide treated wastewater that is environmentally safe.

These and other objects and advantages will be apparent from the following description of the invention.

SUMMARY OF THE INVENTION

A specific example related to high volume pork production is disclosed for illustrative purposes. The principles described enable those of skill in the art to extend the invention to treatment of wastewater from any source.

The wastewater treatment apparatus of the present invention essentially is composed of a variety of biological cultures designed and arranged to achieve the objects of the present invention. The cultures of the present invention are aerobic, anaerobic, and anoxic. A simple embodiment of the invention provides a baffled biological oxidation lagoon (conversion of one existing lagoon) which will provide three specific biological cultures and a clarifier. The sections are baffled to prohibit short circuiting or channeling and to promote the complete oxidation of the contained organic compounds.

The wastewater generated by livestock production is a combination of the treated wastewater returned from a bio-lagoon to flush the production floor, and the freshly generated animal waste.

Defining the source of wastewater, in this case the livestock production site, as upstream, and the final treatment of the wastewater, clarification for example, as downstream, the wastewater treatment modalities described herein are in upstream to downstream relation to each other. The terms "upstream" and "downstream" are intend to describe the connected relationship of the wastewater treatment modalities of the present invention, and are not intended to imply altitudinal or transportational relationship of the treatment modalities or the wastewater therein. It will be understood that movement of wastewater through the treatment modalities of the present invention may be accomplished by any suitable means such as gravity flow or pumping, and that terms to describe such movement herein are for illustrative purposes only and not intended to limit the present invention.

In all embodiments of the present invention described herein, the treated water is utilized to flush the pork production floor. Approximately 80 gallons per minute of treated wastewater is returned to the production floor from the return sump where it is combined with another 10 gallons per minute of water, fresh feces, and urine. 90 gallons per minutes flows from the animal production floor to the separation screen where large suspended solids are separated from the wastewater. The solids may be removed and utilized for a variety of appropriate uses. Fluid may move through the treatment sections of the present invention by a variety of means, including but not limited to, gravity flow or pumping.

The filtrate may be adjusted to a biologically beneficial pH, and flows to the first section of the bio-lagoon for bio-treatment under anoxic conditions. Some embodiments may not require pH adjustment. All remaining nitrate in the returned, treated, wastewater is denitrified in the anoxic culture. Microbes in the anoxic culture denitrify the filtrate. The filtrate then flows by gravity to the anaerobic section of the bio-lagoon where anaerobic microorganisms convert soluble organic compounds eventually to carbon dioxide. The anaerobic section is baffled to prohibit channeling and to guaranty adequate biological contact.

From the anaerobic section, the filtrate flows to the aerobic section of the bio-lagoon. Here, the filtrate cycles from aerobic to anoxic conditions to further remove nitrogen and organic compounds.

In the aerobic section, pressurized air is added by blowers to enhance the growth of aerobic, nitrifying microbes. The air control is cycled "on" and "off" on an approximate 2 hour cycle to create anoxic conditions and to develop denitrification microbes. The aerobic culture is also baffled to prevent channeling.

For final treatment, the filtrate then flows from the aerobic culture to the clarifier, having a weir overflow box to enhance uniform, non-turbulent, flow. Purified filtrate is then pumped to return half of the purified filtrate to the hog house for floor flushing, and irrigation pumps return up to half of the purified filtrate for irrigation.

DETAILED DESCRIPTION OF THE PREFERRED EMBODIMENT

In the following detailed description, the example of high volume pork production is used for illustrative purposes only. It will be clear to those of ordinary skill in the art that the present invention is applicable to all livestock production and industrial or agricultural wastewater generally.

EXAMPLE 1

Figure 1:
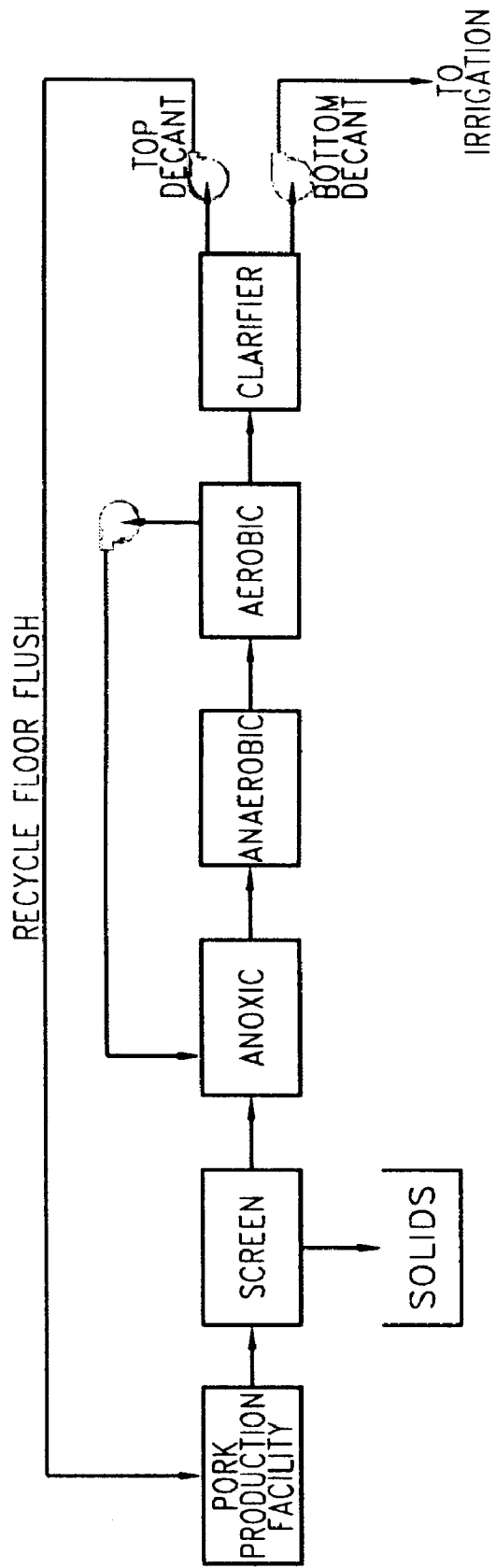
FIG. 1 comprises a flow diagram of an embodiment of the facility of the present invention.

FIG. 1 is a flow diagram illustrating the simplest embodiment of the present invention. Wastewater is transported downstream from the production facility to a liquid-solids separator screen where relatively large solids are removed from the wastewater stream. The wastewater filtrate is transported downstream to an anoxic biological culture, for a first denitrification step of said filtrate.

The filtrate is then transported downstream to an anaerobic culture. The anaerobic culture begins the decomposition of organic matter in the filtrate in the absence of exogenous oxygen.

The filtrate is next transported to an aerobic culture, downstream of said anaerobic culture. The aerobic culture decomposes the organic material in the filtrate in the presence of exogenous oxygen.

A portion of the wastewater treated aerobically is returned upstream to the anoxic culture for further denitrification. This portion of wastewater repeats the cycle of anoxic, anaerobic, and aerobic treatment.

Another portion of the aerobically treated wastewater is transported downstream to a clarifier. The clarifier is a quiet zone where any remaining solids and particulates in the wastewater settle to the bottom and clarify the treated water. Some or all of said solids may be organic matter too small to be filtered out in the initial separation of liquid and solid and which did not settle out of the water being treated during residency in the preceding upstream biological cultures. The organic matter accumulates on the bottom of the clarifier, forming a sludge.

The clarifier is not supplied with exogenous oxygen, so the clarifier itself fosters an anaerobic or even anoxic culture for further bio-treatment of the wastewater in addition to allowing solids to settle.

The clarifier may be thought of as comprising at least two zones, an upper or top zone that is relatively clear and free of solid particulates, but which lacks sufficient organic matter to support a significant bio-culture for further treatment of the wastewater; and a bottom zone that is less clarified but which has sufficient organic material to foster bio-cultures for additional anaerobic or anoxic bio-conversion of the organic material. The treated wastewater from the top of the clarifier is suitable for return to the production site for floor flushing (recycle floor flush). The wastewater from the bottom of the clarifier is suitable, for example, for agricultural irrigation.

EXAMPLE TWO

Figure 2:
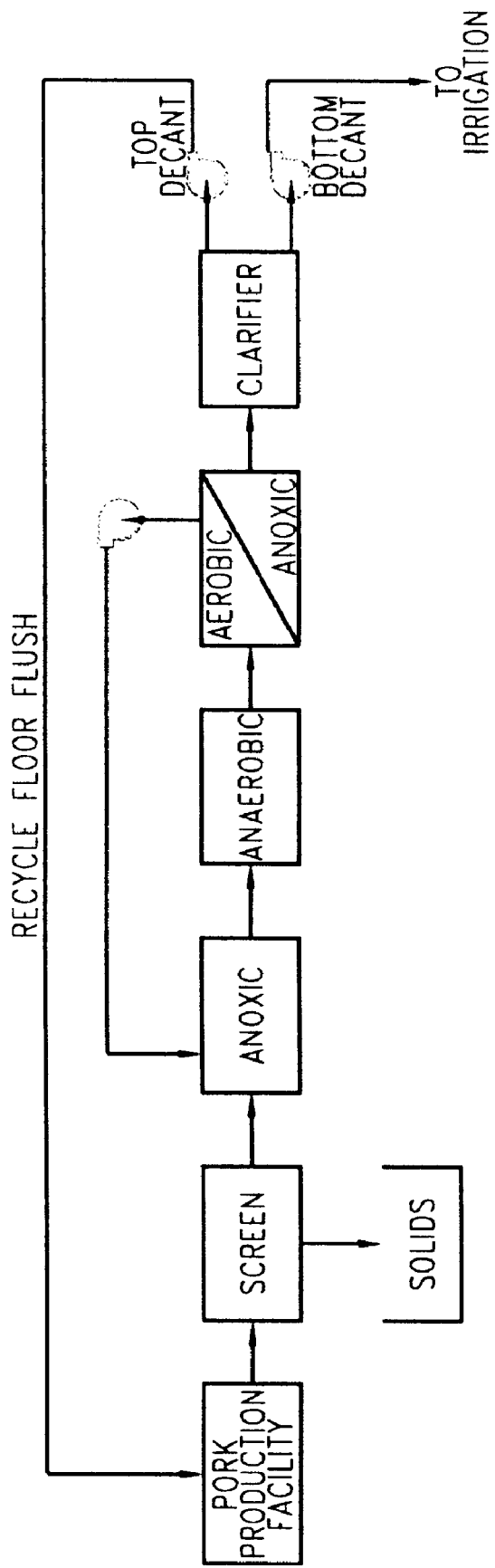
FIG. 2 comprises a flow diagram of an alternate embodiment of the present invention.

FIG. 2 illustrates a second embodiment of the present invention. This alternate embodiment is similar to Example One, except that, as shown in FIG. 2, the third culture is shown as aerobic/anoxic. The aerobic culture of the present embodiment is established by providing exogenous oxygen to the culture. The exogenous oxygen, however, is not uniformly available to the microorganisms of the culture. Oxygen is readily available to microorganisms near the source of oxygen, but organisms far from the oxygen source are in an anoxic environment. Therefore, the culture fosters distinct sub-zones comprising at least one aerobic sub-zone and at least one anoxic sub-zone. As in Example One, a portion of the filtrate from the third culture may be recycled to the first upstream anoxic culture and a portion may be transported downstream to the clarifier.

EXAMPLE THREE

Figure 3:
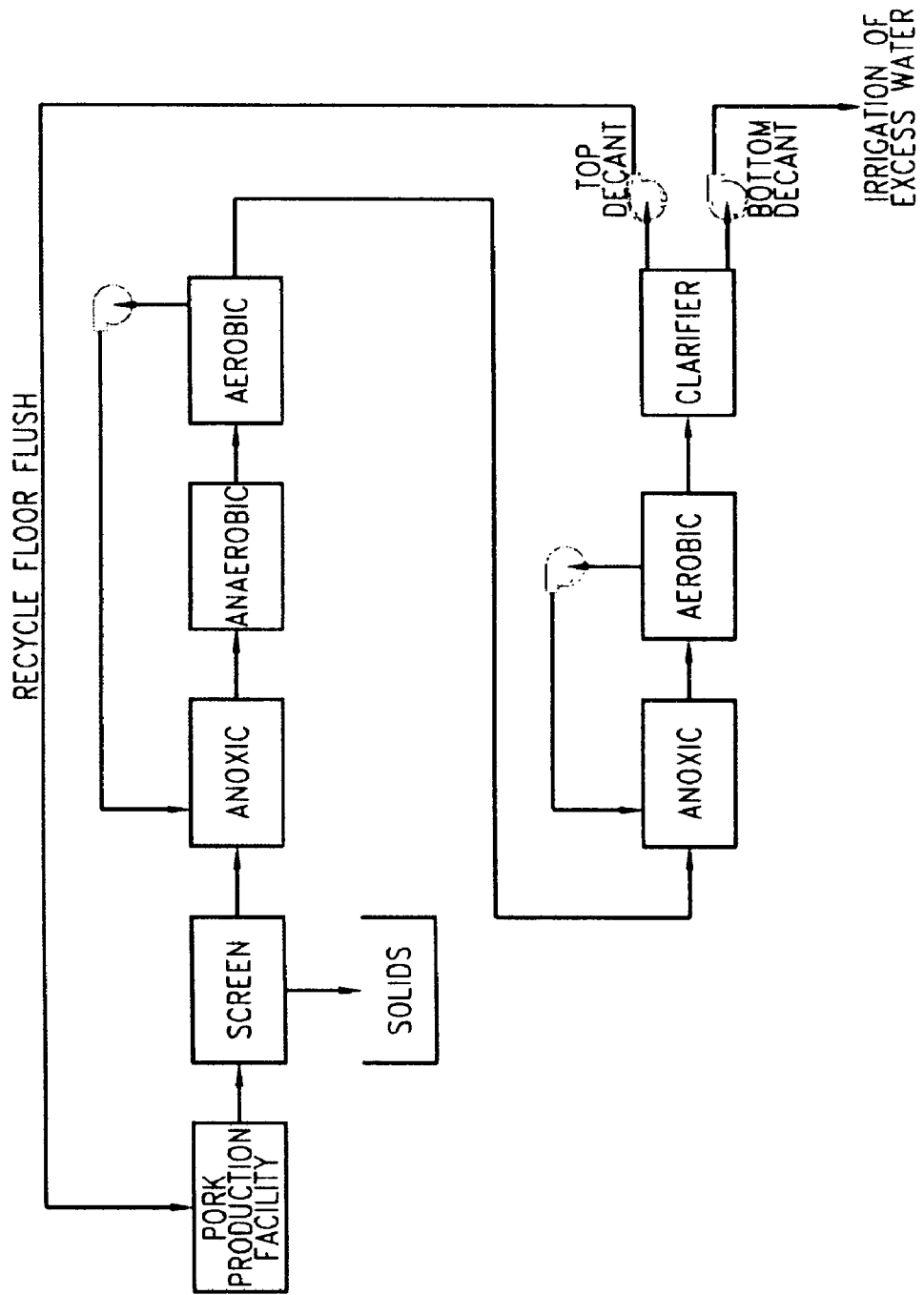
FIG. 3 comprises a flow diagram of an alternate embodiment of the present invention.

FIG. 3 is a flow diagram illustrating yet another embodiment of the present invention. The embodiment of FIG. 3 comprises an additional anoxic and an additional aerobic culture down stream of what is now the first aerobic culture. In the present embodiment, the portion of treated wastewater transported to the clarifier in Examples 1 and 2 is transported to a second anoxic culture downstream from the first aerobic culture, and a portion of the wastewater is recycled upstream from the first aerobic culture to the (now) first anoxic culture, as in Example 2. Denitrification of the wastewater by the microbes fostered under anoxic conditions is less efficient than the action of aerobic or anaerobic microbes on organic material. Therefore, the residency time of the wastewater in the anoxic culture required to achieve a desired level of denitrification may be a rate limiting step of the bio-treatment of wastewater. Additional exposure of the wastewater to the denitrifying microbes in anoxic cultures, as provided in Examples 2 and 3, may be useful where one desires the greatest amount of denitrification possible with the shortest possible residency time of the wastewater in a particular anoxic culture. In the present Example, such additional exposure is provided by a second anoxic culture downstream of the (now) first anoxic culture described in Examples 1 and 2.

The wastewater is transported downstream from the second anoxic culture to a second aerobic culture to continue the removal of organic matter from the wastewater. As in Example 2, a portion of the wastewater may be returned to the second anoxic culture for further denitrification. A portion of the wastewater is transported to a clarifier as described above.

EXAMPLE 4

Figure 4:
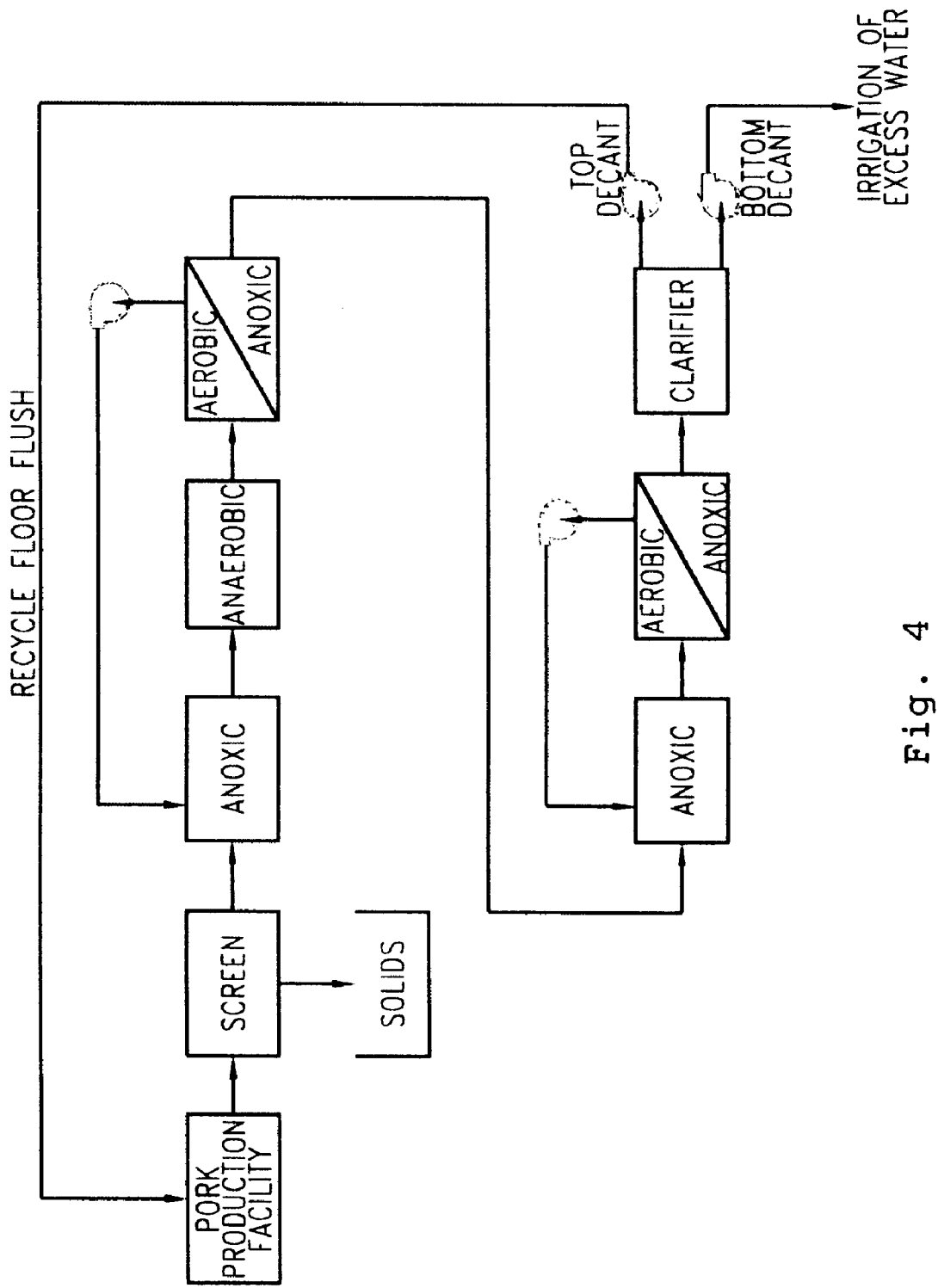
FIG. 4 comprises a flow diagram of an alternate embodiment of the present invention.

FIG. 4 is a flow diagram illustrating another embodiment of the present invention. The embodiment of FIG. 4 combines elements of Examples 2 and 3. As in Example 2, the first aerobic culture forms at least one aerobic and one anoxic sub-zone as described above. Similarly, the second aerobic culture (of Example 3) forms at least one aerobic and at least one anoxic sub-zone. A portion of the first aerobic/anoxic culture wastewater may be recycled upstream to the first anoxic culture, and a portion of the second aerobic/anoxic culture may be recycled upstream to the second anoxic culture. The non-recycled portion of the wastewater is transported to the next downstream culture or clarifier.

Figure 5A:
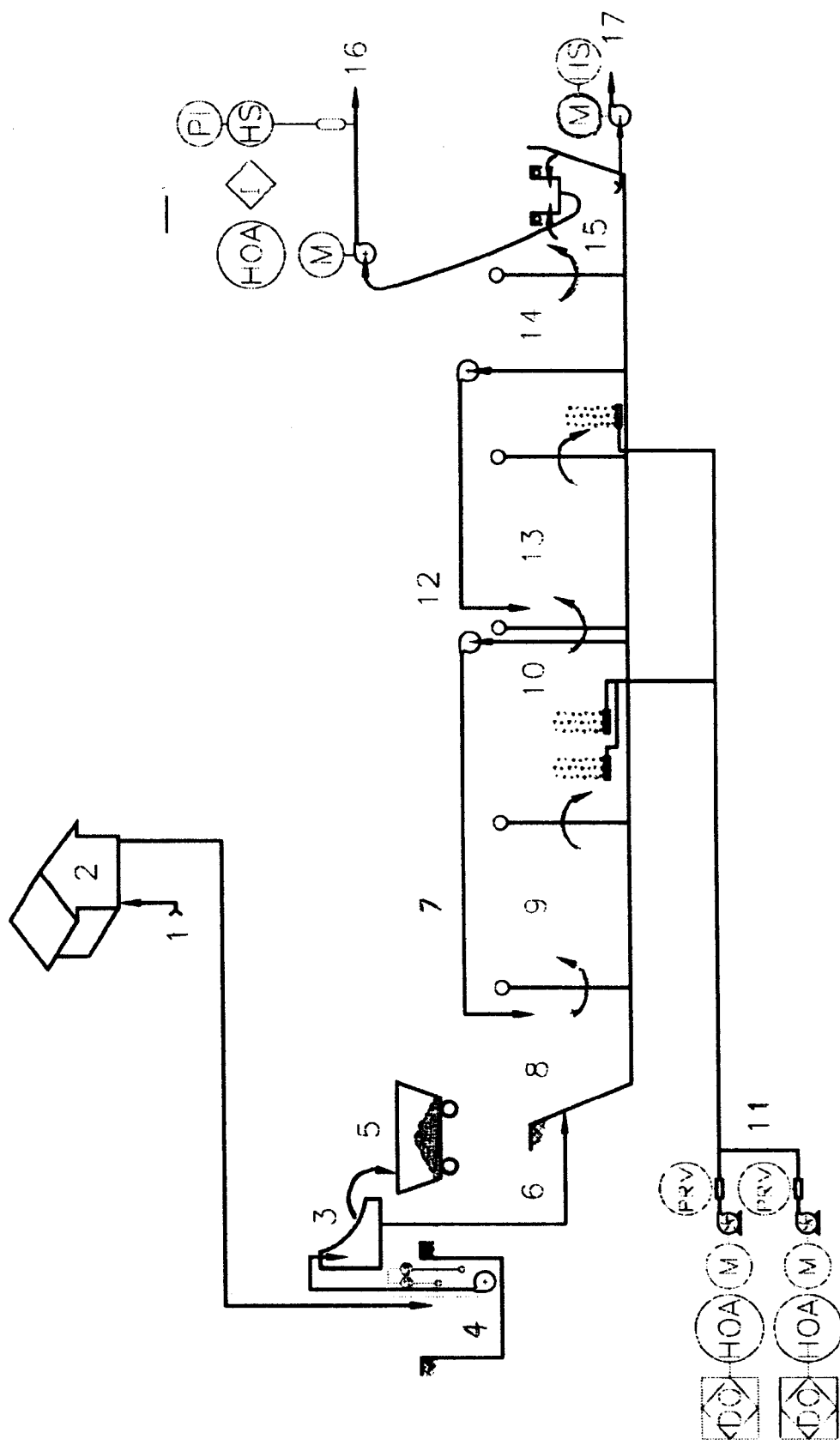
FIG. 5A comprises a schematic view of the embodiment of the facility of the present invention depicted by FIG. 1.
Figure 5B:
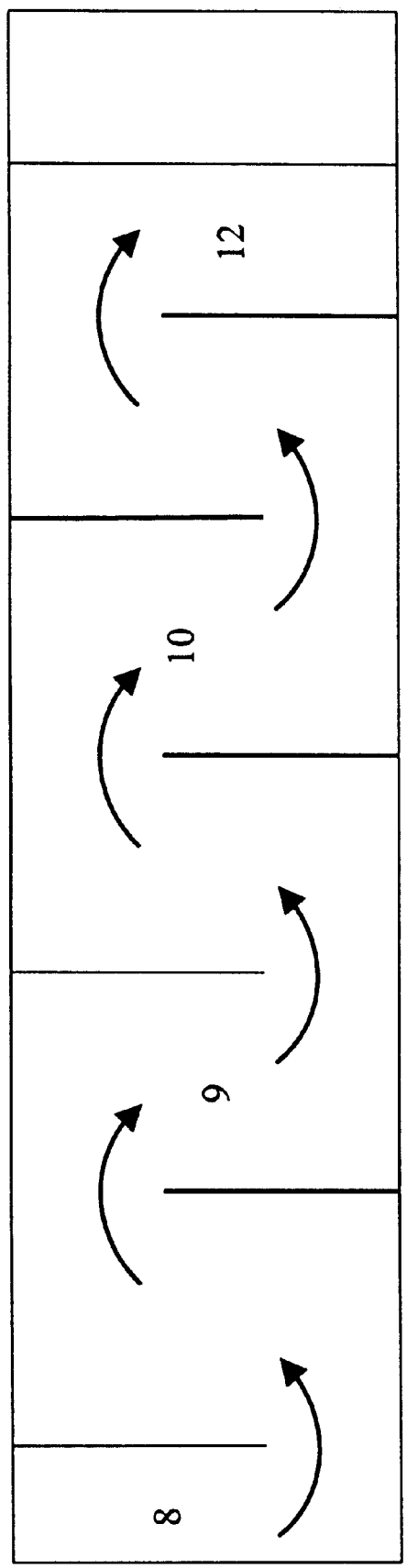
FIG. 5B comprises an overhead schematic view of the embodiment of FIG. 5A.

FIG. 5 comprises a schematic view of the embodiment of the facility of the present invention depicted by FIG. 1. Flush water 1 is returned to the production site 2 from the clarifier 12. The waste liquid leaving the livestock production house 2 contains the currently generated animal waste with high concentrations of urea and livestock manure (undigested food stuffs). The water is transported from the livestock production facility to an incline wedge wire screen 3 for gross separation of solids 5 from liquid. Other types of screen separators may be utilized, such as rotating screens and vibrating screens. The screen 3 removes the large suspended solids (undigested food products) 5 leaving primarily soluble organic compounds, urea, and minute suspended food particles in the example herein disclosed. The waste leaving the hog house contains approximately 13,000 mg/l filterable suspended solids, 2,500 mg/l soluble carbonaceous oxygen demand (COD), and over 500 mg/l ammonia (urea). Fifty percent or more of the solids will be removed by the screen, producing a salvageable food stuff base which may be as much as 5,000 to 10,000 pounds dry weight per day.

In the preferred embodiment, the filtrate leaving the screens is pumped or lifted at station 4 to a central conditioning pH adjustment tank 6 located near the bio-oxidation lagoon. The pH is monitored and controlled to insure the most biologically beneficial pH is maintained in the bio-lagoon. An alternative embodiment of the present invention does not require pH adjustment of the wastewater. Organic acids generated by the bio-reduction of organic matter in the wastewater can be bio-converted by microbrobes such as methanobacteria. The presence in a bio-culture of microbes that can process organic acids may obviate the necessity for pH adjustment of the wastewater in some embodiments of the present invention.

The water flows by gravity from the conditioning tank to the entrance section of the bio-lagoon 7. The bio-lagoon is divided into sections to form a continuous bio-reactor without short circuiting, see FIG. 5B. The sections include an anoxic section 8, to foster the growth of denitryfying microbes in an oxygenless culture; an anaerobic section 9, to foster the growth of facultative bacteria to remove organics from the wastewater in the absence of exogenous oxygen; an aerobic section 10, to foster the growth of facultative bacteria in the presence of exogenous oxygen to remove organic matter from the wastewater; and a clarifier 12, to achieve a quiet state in the wastewater to allow particulate and other solid material to settle out of the wastewater. Operational parameters of each section are described in Table 1 for illustrative purposes only and are not intended to limit the scope of the present invention.

TABLE 1

|  | Anoxic | Anaerobic | Aerobic | Clarifier |
|---|---|---|---|---|
| Length (in feet) | 82 | 80 | 212 | 20 |
| % | 20 | 22 | 53 | 5 |
| Capacity | 900,000 gal | 800,000 gal | 1,200,000 gal | 200,000 gal |
| Retention | 7 days | 6 days | 9 days | 1.5 days |

The fluid volume capacities and retention times indicated in Table 1 for the various biological cultures of the present invention are shown for illustrative purposes only. The present invention may be varied and practiced with whatever volumes and retention times required-to make it effective.

The first section 8 is specifically engineered to maintain and promote the growth of anoxic microbes. This anoxic section has approximately 900,000 gallons capacity. The specifically cultured microbes denitrify any nitrate compounds exiting the final section of the bio-pond (the treated floor flush water return from the bio-pond).

In the anaerobic section 9, the methogenic microbes decompose the soluble organic components in the absence of oxygen. This is the most cost efficient method to remove soluble organic compounds. The anaerobic section will have approximately 800,000 gallons yielding 6 days retention time. Due to the extended retention time, rapid thorough mixing which would normally enhance bio-oxidation will not be required. However, mixers may be added to enhance the growth of the bio-culture. The level of organic components will be reduced from 5,000 to 7,000 mg/l to approximately 200–1000 mg/l in the anaerobic culture. The anaerobic microbes do not digest or nitrify the ammonia, hence, the ammonia contents will essentially be unchanged.

The anaerobically treated wastewater flows into the aerobic section 10. The aerobic section contains some 1,200,000 gallons with approximately 09 days retention. At least one air blower, but preferably a pre-engineered set of coarse bubble diffusors 11, are mounted through the baffled aerobic section. The blowers add a continuous flow of air to create a pre-set oxygen content of approximately 2.5 to 3.0 mg/l. At least one analytical probe 15 mounted in this lagoon section continuously senses the level of oxygen. The probe is connected to the blowers to automatically shut off or turn on the blowers, as appropriate, depending on the detected oxygen level, similar to a thermostat. When fully aerobic conditions, 2.5 or more mg/l oxygen, have been established for a pre-set period of time (approximately 30 minutes) the probe automatically shuts off the blowers permitting the bio-mass culture time to settle. The aerobic microbes consume all of the available soluble oxygen creating an anoxic environment. When the dissolved oxygen content reaches a level of essentially zero, the probe 15 automatically restarts the blowers, restoring the aerobic environment.

In an alternative embodiment, the dissolved oxygen content may be determined by laboratory evaluation and then a timer may be employed to operate the blowers. A fixed cycle of eleven hours on and one hour off may be established. The time of blower operation may vary from 20 minutes to 12 hours on alternating with from 20 minutes to 12 hours of the blowers being off. Once the cycle times have been established by laboratory analytical measurements, the cycle will be automatic and remain fixed.

The system is specially designed to achieve the following conditions:

(1) the wastewater entering the aerobic section contains soluble organic compounds as well as the ammonia/urea waste. When the blowers are "on", a fully aerobic environment is established. The soluble organic components are biologically decomposed, creating carbon dioxide gas which is emitted to the atmosphere. When the organic components reach a low concentration, the nitrosomonas and nitrobacter microbes rapidly multiply and oxidize the ammonia/urea into nitrite and eventually into nitrate compounds;

(2) When the blowers are "shut off" and the bio-mass settles, an anoxic environment is created, and the growth of a culture of denitrifier microbes is promoted. This condition is specifically fostered in the layer of settled bio-mass. The denitrifier microbes in the presence of a carbon source (undigested waste) and the soluble nitrate components, utilize the oxygen in the nitrate for metabolism and release free nitrogen to the atmosphere. When the submerged dissolved oxygen instrument senses a complete anoxic environment, the blowers will be restarted. By cycling the environmental condition from aerobic (to oxidize the ammonia) to anoxic (to denitrify the nitrate), the ammonia and nitrogen related components are essentially removed from the treated wastewater. The fully aerobic conditions created when the blowers are on will nitrify practically all of the ammonia. The anoxic microbes are not as efficient as the aerobic nitrosomonas microbes and some nitrate may remain. This remaining nitrate is denitrified, if desired, by returning a portion, 50%, for example, of the treated wastewater back to flush the production floor, from where it returns to the anoxic section. The nitrate in the returned floor wash component will be denitrified in the initial section of the bio-pond-the anoxic section. To enhance the denitrification, a slip stream of up to 50% of the aerobic effluent may be returned directly to the anoxic section. A 50% return will essentially reduce the total nitrogen content of the returned treated wastewater by 50% (FIGS. 1–4).

(3) The aerobic section, baffled to prevent short circuiting, has the majority of the air diffusers in the initial section. Since the retention time is approximately 9 days retention, the mixed liquor suspended solids (MLSS) will be relatively low. The estimated level of MLSS leaving the aerobic section may be less than 300 mg/l. Most of the aged microbes will attain their full life cycle, die and be decomposed in the aeration section relieving the load in the clarifier. The filtrate enters the aerobic culture with about 400 to 800 mg/l BOD and exits the aerobic culture with about 50 mg/l BOD and 50–120 mg/l ammonia and 30 mg/l nitrate.

The treated wastewater and entrained excess microbes flow into the clarification section 12. Here, water reaches a very quietus state and the entrained suspended solids settle to the bottom. The clarified water overflows a weir overflow plate that encourages uniform flow across the clarifier. This component assures a uniform, low, non-turbulent exit velocity. The clarified water flows to the return sump and is pumped back to the livestock reduction area or to fields for irrigation. The collected solids, excess microbes, collect in the bottom of the clarifier and slowly decompose. A soil-like humus mass slowly accumulates. It is estimated that the decomposed bio-mass will require dredging in approximately every one to three years. The accumulated solids may be pumped through the screens and returned to the anoxic section for further degradation. In an alternate embodiemnt, the inlet pipe to the irrigation pump may be located in the bottom of the clarifier, hence each time the excess water is pumped out for irrigation, the excess bio-solids are removed from the clarifier.

In most installations, the excess water is utilized for crop irrigation. As the treated wastewater accumulates in the clarifier 12 (and therefore the total lagoon) a portion, about 80%, is returned to the hog house 2 to be utilized to flush the hog floor. An accumulation sump is provided following the clarifier weir overflow plate to permit the return sump to operate. Since the inflow is 100 gallons per minute, and only 80 gallons per minute is returned to the hog house, the remaining 20 gallons per minute will accumulate in the lagoon. The clarifier weir plate is designed to permit the accumulation of up to 12" in the lagoon and continue to provide a uniform overflow rate. In an alternate embodiment, instead of a fixed weir clarifier, a small floating laundry ring may be connected to the treated water return pump. Since only flush water will be pumped through the floating clarifier weir plate, the unit may be designed for an 80 gpm. High volume irrigation water, up to 500 gpm, may be pumped directly from the bottom of the clarifier. The weir design permits an accumulation of up to 500,000 gallons before the excess treated water must be pumped to the irrigation fields. The treated water will have the COD content reduced by 97–99% and the nitrogen content reduced by 70–90%. The level of COD is expected to be reduced to 20–50 mg/l, and nitrogen content lowered to 50/120 mg/l.

The resultant water will be used in two areas:

(1) Hog Floor Flushing

In the specific embodiment disclosed, approximately 30% is continuously returned by pump 13 to the hog houses to flush the floor. With the reduced ammonia content, returned flush water will not contribute to the ambient ammonia content in the air. A more healthful environment is provided for the hogs and, hence more efficient growth can be expected.

(2) Irrigation

Approximately 20% may be provided by pump 14 for irrigation. Since the nitrogen content of the wastewater has been reduced 50–120 mg/l, and with 20 gallons per minute excess stream, the total amount of nitrogen contained in the irrigation water is only 10–40 pounds per day. If the water is used to irrigate cotton land, it may be distributed over 60–200 acres while remaining within the limits required by the law for nitrogen content in the production of cotton. If it is utilized for the irrigation of hay, only water for 15–50 acres will be required. Whether the irrigation water is used for cotton or hay, practically all of the crop fertilizer requirements will be satisfied by the irrigation water.

To enhance a stable microbial population, a slip stream may be returned to the initial sections from either the aerobic section or the clarifier. The returned stream shall be drawn from the bottom of the designated section to secure a higher concentration of microbial life. The return stream insures a stable culture. Also, nitrosomonas and nitrobacter microbes grow at a rate slower than the normal carbon/exogenous oxygen microbes. A certain portion of the mature nitrifying microbes must, therefore, be returned to "seed" the influent mixture and insure a stable culture of the desired microbes.

The effluent from the aerobic section will contain from 50–120 mg/l nitrogen (combination of both nitrate and ammonia). The aerobic cell is less than 100% efficient (90% may be utilized in calculations) in the conversion of ammonia to nitrate and the anoxic section also will not biologically oxidize all of the nitrate (95% is typically utilized in the art for calculation purposes). The aerobic effluent may be further treated by two smaller additional cells. FIG. 3. The first cell will be anoxic to remove the complimentary amount of nitrate not recycled to the initial anoxic section. The secondary anoxic section will have a minimal biological food source (most of the biologically available microbial food will have been removed in the aerobic section), therefore, the recycle stream from the first aerobic culture to the first anoxic culture must remain in place to remove the bulk of the nitrate. The second anoxic section may be utilized only for the small amount of nitrate that passes through the first aerobic culture. The second anoxic culture must be followed by a second aerobic section to remove trace ammonia and untreated food sources (organics). The wastewater is then transported downstream from the aerobic section to the clarifier to remove the excess biomass.

The nitrogen level may be further reduced by the addition of two more cells, each being anoxic/aerobic, see FIG. 4. Each additional pair of anoxic/aerobic cell sections added significantly reduces the total nitrogen content.

FIGS. 1–4 are attached schematically exhibiting the four alternative methods. The systems may be chosen as required to attain the desired level of nitrogen in the effluent. The final concentration will vary 60–140 mg/l when using the system of FIG. 1 to less than 1 mg/l when using the system of FIG. 4.

The data in Tables 1–9 exhibits the nitrogen content available from the four systems depicted in FIGS. 1–4. For calculation purposes the following data was chosen:

| Data Base: | -Influent Flow Rate | 100 gpm |
| --- | --- | --- |
| | -Effluent Flow Rate | 100 gpm |
| | -Influent Nitrogen Content | 500 mg/l |
| | -Conversion Efficiency | |
| | Anoxic - Nitrate to Nitrogen | 95% |
| | Aerobic - Ammonia to Nitrate | 90% |
| | Nitrate/N conversion by cycling the blower (air source) on/off In the aerobic section | 50% |
| | -Recycle Rate | |
| | Case 1 - Aerobic 1 to Anoxic 1 | 300 gpm (3X) |
| | Aerobic 2 to Anoxic 2 | 100 pm (1X) |
| | Case 2 - Aerobic 1 to Anoxic 1 | 300 gpm (3X) |
| | Aerobic 2 to Anoxic 2 | 300 pm (3X) |

The efficiency of microbial conversion of ammonia to nitrate and nitrate to nitrogen may vary widely, but the concept remains the same. The recycle rate may vary from a ratio of 0.1 of recycle flow relative to total flow to a ratio of 100 of recycle flow relative to total flow, with the concept remaining the same. An economical level of recycle must be chosen that will provide adequate return and minimal to maximum agitation (mixing) of the anoxic section.

The re-circulation return lines may be equipped with flow eductors to increase the mixing rate in the anoxic sections.

Since the clarifier is a quiet zone without the addition of oxygen, it essentially becomes an additional anoxic zone. If there is a food source available, the contained nitrate is biologically oxidized producing nitrogen gas and further reducing the total nitrogen content. Table 9 exhibits a represented analysis of the clarifier effluent from each system detailed in Table 1–6.

The anoxic denitrification of nitrate to nitrogen requires an available food source. The overall system kinetics must be adjusted to provide adequate food support life for the denitrification bacteria. If adequate food does not naturally occur or the system cannot be adjusted to provide adequate food, additional synthetic food may be provided. An inexpensive soluble carbon source may be added to the anoxic sections to support biological life. The most commonly available carbon sources are methyl alcohol (methanol) or common sugar (sucrose).

Figure 6A:
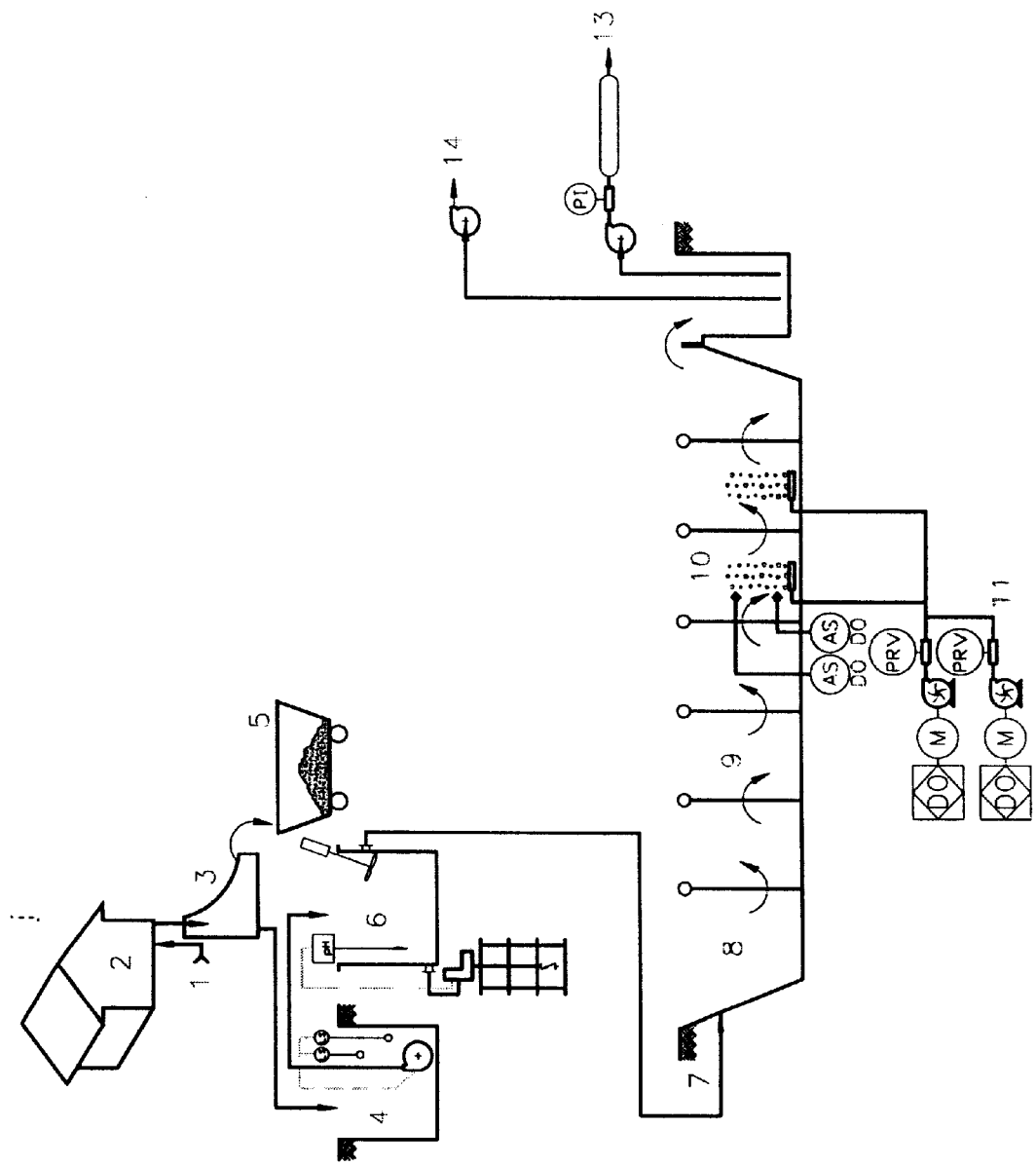
FIG. 6A comprises a schematic view of the alternate embodiment of the facility of the present invention depicted in FIG. 4.

FIG. 6A comprises a schematic view of the embodiment of the facility of the present invention as depicted in FIG. 4. 80 gallons per minute (gpm) of return flush water 1 enters the production site, 100 gpm of wastewater 2 comprising the return flush water and production waste. The upstream handling of the wastewater is the same as in FIG. 5A until the wastewater reaches the first aerobic culture 10. A portion of the wastewater 7 (300 gpm) is returned upstream to the first anoxic culture 8 for additional denitrification. Aerobically treated wastewater is transported downstream to a second anoxic culture 13, followed by a second aerobic culture 14, where the wastewater 12 is recycled through the second anoxic culture for further denitrification. Wastewater treated in the second aerobic culture is transported downstream to the clarifier 15. A portion of the water 17 at the top of the clarifier is returned to the production site for floor flushing. The floor flush return water may be returned to the production site by pressurizing the return water.

Figure 6B:
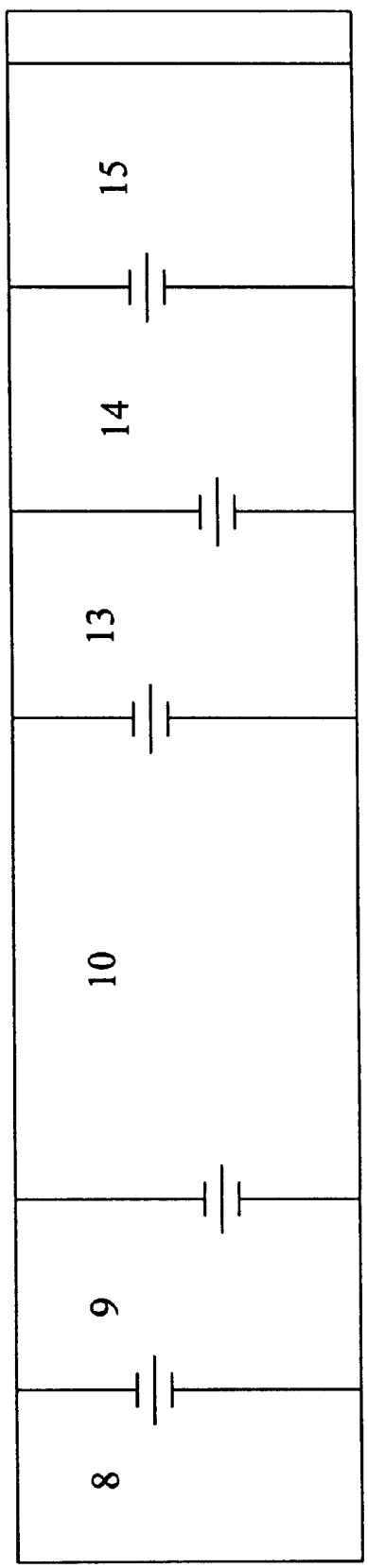
FIG. 6B comprises an overhead schematic view of the embodiment of FIG. 6A.
Figure 7:
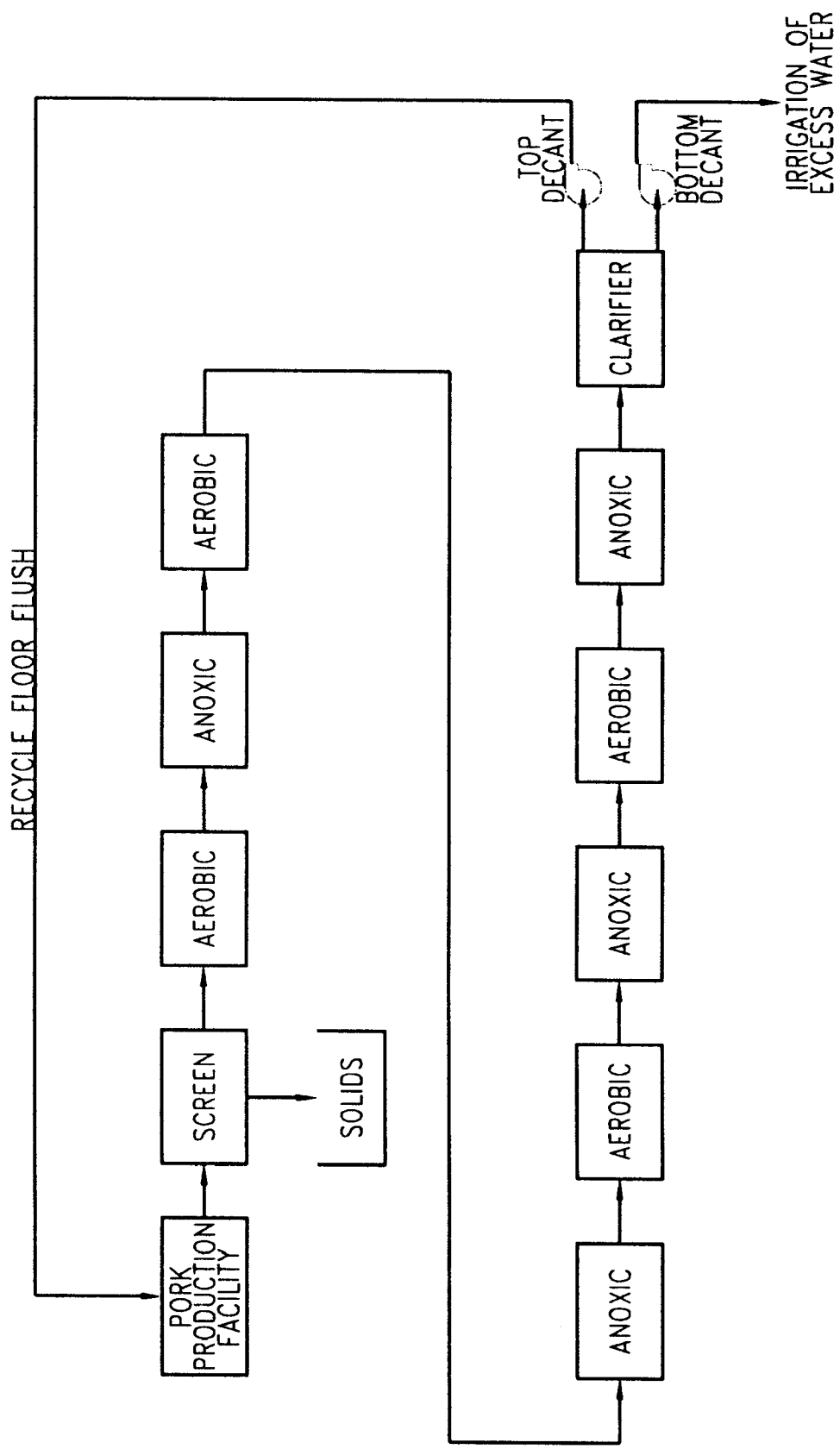

The baffling of the culture sections is illustrated in FIG. 6B, an overhead schematic view of the facility depicted in FIG. 6A. It is not required by the present invention that the anoxic, anaerobic, and aerobic cultures exist in a baffled bio-lagoon. Above-surface containers such as concrete or steel tanks are also suitable.

The wastewater treatment facility and methods of the present invention is simple. It does not require any chemicals to precipitate soluble nitrogen and organic compounds. There is no skimming of the bio-cultures required to maintain biological activity.

Although the present invention has been described, and illustrated in detail, it is clearly understood that the same is by way of illustration and example only, and is not to be taken by way of limitation on the scope and spirit of the present invention.

TABLE 1

Anoxic/Anerobic/Aerobic with 300% Aerobic return to Anoxic

| | RAW | | RECYCLE | | TOTAL | |
| --- | --- | --- | --- | --- | --- | --- |
| | CON | MASS | CON | MASS | CON | MASS |
| Anoxic Biocell 1 | | | | | | |
| Flow | 100 gpm | 1,200,000 #/d | 300 gpm | 3,600,000 #/d | 0 | 4,800,000 #/d |
| BOD | 3,000 mg/l | 3600 #/d | 5 mg/l | 18 #/d | 768 mg/l | 3618 #/d |
| $NH_3$—N | 500 mg/l | 600 #/d | 14 mg/l | 50 #/d | 135 mg/l | 650 #/d |
| $NO_3$—N | 0 | 0 | 125 mg/l | 468 #/d | 93.75 mg/l | 468 #/d |
| Aerobic Biocell 1 | | | | | | |
| Flow | | | | | 400 gpm | 4,800,000 #/d |
| BOD | | | | | 225 mg/l | 1080 #/d |
| $NH_3$—N | | | | | 135 mg/l | 650 #/d |
| $NO_3$—N | | | | | 5 mg/l | 24 #/d |

| | RECYCLE | | OUT | |
| --- | --- | --- | --- | --- |
| | CON | MASS | CON | MASS |
| Anoxic Biocell 1 | | | | |
| Flow | | | 400 gpm | 4,800,000 #/d |
| BOD | | | 225 mg/l | 1080 #/d |
| $NH_3$—N | | | 135 mg/l | 650 #/d |

TABLE 1-continued

Anoxic/Anerobic/Aerobic with 300% Aerobic return to Anoxic

| | | | | | |
|---|---|---|---|---|---|
| $NO_3$—N | | | | 5 mg/l | 24 #/d |
| Aerobic Biocell 1 | | | | | |
| Flow | 300 gpm | 3,600,000 #/d | 100 gpm | 1,200,000 #/d | |
| BOD | 5 mg/l | 18 #/d | 5 mg/l | 6 #/d | |
| $NH_3$—N | 14 mg/l | 50 #/d | 13.5 mg/l | 16.2 #/d | |
| $NO_3$—N | 130 mg/l | 468 #/d | 130 mg/l | 156 #/d | |

TABLE 2

Anoxic/Anerobic/Aerobic with 300% Aerobic return to Anoxic and Alternating Aerobic/Anoxic Cycle

| | RAW | | RECYCLE | | TOTAL | |
|---|---|---|---|---|---|---|
| | CON | MASS | CON | MASS | CON | MASS |
| Anoxic Biocell 1 | | | | | | |
| Flow | 100 gpm | 1,200,000 #/d | 300 gpm | 3,600,000 #/d | 0 | 4,800,000 #/d |
| BOD | 3,000 mg/l | 3600 #/d | 5 mg/l | 18 #/d | 768 mg/l | 3,618 #/d |
| $NH_3$—N | 500 mg/l | 600 #/d | 14 mg/l | 50 #/d | 135 mg/l | 650 #/d |
| $NO_3$—N | 0 | 0 | 65 mg/l | 234 #/d | 49 mg/l | 234 #/d |
| Aerobic Biocell 1 | | | | | | |
| Flow | | | | | 400 gpm | 4,800,000 #/d |
| BOD | | | | | 225 mg/l | 1080 #/d |
| $NH_3$—N | | | | | 135 mg/l | 650 #/d |
| $NO_3$—N | | | | | 3 mg/l | 12 #/d |

| | | RECYCLE | | OUT | |
|---|---|---|---|---|---|
| | | CON | MASS | CON | MASS |
| Anoxic Biocell 1 | | | | | |
| Flow | | | | 400 gpm | 4,800,000 #/d |
| BOD | | | | 225 mg/l | 1080 #/d |
| $NH_3$—N | | | | 135 mg/l | 650 #/d |
| $NO_3$—N | | | | 3 mg/l | 12 #/d |
| Aerobic Biocell 1 | | | | | |
| Flow | | 300 gpm | 3,600,000 #/d | 100 gpm | 1,200,000 #/d |
| BOD | | 5 mg/l | 18 #/d | 5 mg/l | 6 #/d |
| $NH_3$—N | | 13.5 mg/l | 50 #/d | 13.5 mg/l | 16.2 #/d |
| $NO_3$—N | | 65 mg/l | 234 #/d | 65 mg/l | 78 #/d |

TABLE 3

Anoxic/Anerobic/Aerobic/Anoxic/Aerobic with 300%/100% Aerobic return to Anoxic

|  | RAW | | RECYCLE | | TOTAL | |
| --- | --- | --- | --- | --- | --- | --- |
|  | CON | MASS | CON | MASS | CON | MASS |
| Anoxic Biocell 1 | | | | | | |
| Flow | 100 gpm | 1,200,000 #/d | 300 gpm | 3,600,000 #/d | 400 | 4,800,000 #/d |
| BOD | 3,000 mg/l | 3600 #/d | 50 mg/l | 180 #/d | 787 mg/l | 3,730 #/d |
| $NH_3$—N | 500 mg/l | 600 #/d | 14 mg/l | 50 #/d | 135 mg/l | 650 #/d |
| $NO_3$—N | 0 | 0 | 125 mg/l | 468 #/d | 94 mg/l | 468 #/d |
| Aerobic Biocell 1 | | | | | | |
| Flow | | | | | 400 gpm | 4,800,000 #/d |
| BOD | | | | | 225 mg/l | 1080 #/d |
| $NH_3$—N | | | | | 135 mg/l | 650 #/d |
| $NO_3$—N | | | | | 5 mg/l | 24 #/d |
| Anoxic Biocell 2 | | | | | | |
| Flow | 100 gpm | 1,200,000 #/d | 100 gpm | 1,200,000 #/d | 200 gpm | 2,400,000 #/d |
| BOD | 60 mg/l | 60 #/d | 2 mg/l | 2 #/d | 26 mg/l | 62 #/d |
| $NH_3$—N | 13.5 mg/l | 16.2 #/d | 0.7 mg/l | 0.8 #/d | 7.1 mg/l | 17.0 #/d |
| $NO_3$—N | 121 mg/l | 145 #/d | 9.0 mg/l | 10.8 #/d | 65 mg/l | 156 #/d |
| Aerobic Biocell 2 | | | | | | |
| Flow | | | | | 200 gpm | 2,400,000 #/d |
| BOD | | | | | 4 mg/l | 10 #/d |
| $NH_3$—N | | | | | 7.1 mg/l | 17 #/d |
| $NO_3$—N | | | | | 3 mg/l | 7 #/d |

|  | RECYCLE | | OUT | |
| --- | --- | --- | --- | --- |
|  | CON | MASS | CON | MASS |
| Anoxic Biocell 1 | | | | |
| Flow | | | 400 gpm | 4,800,000 #/d |
| BOD | | | 225 mg/l | 1080 #/d |
| $NH_3$—N | | | 135 mg/l | 650 #/d |
| $NO_3$—N | | | 5 mg/l | 24 #/d |
| Aerobic Biocell 1 | | | | |
| Flow | 300 gpm | 3,600,000 #/d | 100 gpm | 1,200,000 #/d |
| BOD | 50 mg/l | 180 #/d | 50 mg/l | 60 #/d |
| $NH_3$—N | 13.5 mg/l | 50 #/d | 13.5 mg/l | 16.2 #/d |
| $NO_3$—N | 121 mg/l | 436 #/d | 121 mg/l | 4 #/d |
| Anoxic Biocell 2 | | | | |
| Flow | | | 200 gpm | 2,400,000 #/d |
| BOD | | | 4 mg/l | 10 #/d |
| $NH_3$—N | | | 7.1 mg/l | 17.0 #/d |
| $NO_3$—N | | | 3 mg/l | 7 #/d |
| Aerobic Biocell 2 | | | | |
| Flow | 100 gpm | 1,200,000 #/d | 100 gpm | 1,200,000 #/d |
| BOD | 2 mg/l | 2 #/d | 2 mg/l | 2 #/d |
| $NH_3$—N | 0.7 mg/l | 0.8 #/d | 0.7 mg/l | 0.8 #/d |
| $NO_3$—N | 9.0 mg/l | 10.8 #/d | 9.0 mg/l | 10.8 #/d |

TABLE 4

Anoxic/Anerobic/Aerobic/Anoxic/Aerobic with 300%/300% Aerobic return to Anoxic

|  | RAW | | RECYCLE | | TOTAL | |
| --- | --- | --- | --- | --- | --- | --- |
|  | CON | MASS | CON | MASS | CON | MASS |
| Anoxic Biocell 1 | | | | | | |
| Flow | 100 gpm | 1,200,000 #/d | 300 gpm | 3,600,000 #/d | 400 | 4,800,000 #/d |
| BOD | 3,000 mg/l | 3600 #/d | 50 mg/l | 180 #/d | 787 mg/l | 3,730 #/d |

TABLE 4-continued

Anoxic/Anerobic/Aerobic/Anoxic/Aerobic with 300%/300% Aerobic return to Anoxic

| | | | | | | |
|---|---|---|---|---|---|---|
| NH$_3$—N | 500 mg/l | 600 #/d | 14 mg/l | 50 #/d | 135 mg/l | 650 #/d |
| NO$_3$—N | 0 | 0 | 125 mg/l | 468 #/d | 94 mg/l | 468 #/d |
| Aerobic Biocell 1 | | | | | | |
| Flow | | | | | 400 gpm | 4,800,000 #/d |
| BOD | | | | | 225 mg/l | 1080 #/d |
| NH$_3$—N | | | | | 135 mg/l | 650 #/d |
| NO$_3$—N | | | | | 5 mg/l | 24 #/d |
| Anoxic Biocell 2 | | | | | | |
| Flow | 100 gpm | 1,200,000 #/d | 300 gpm | 3,600,000 #/d | 400 gpm | 4,800,000 #/d |
| BOD | 50 mg/l | 60 #/d | 2 mg/l | 2 #/d | 26 mg/l | 62 #/d |
| NH$_3$—N | 13.5 mg/l | 16.2 #/d | 0.4 mg/l | 1.4 #/d | 3.7 mg/l | 18.0 #/d |
| NO$_3$—N | 121 mg/l | 145 #/d | 5.0 mg/l | 18 #/d | 34 mg/l | 163 #/d |
| Aerobic Biocell 2 | | | | | | |
| Flow | | | | | 400 gpm | 4,800,000 #/d |
| BOD | | | | | 4 mg/l | 10 #/d |
| NH$_3$—N | | | | | 3.7 mg/l | 18 #/d |
| NO$_3$—N | | | | | 1.7 mg/l | 8.1 #/d |

| | RECYCLE | | OUT | |
|---|---|---|---|---|
| | CON | MASS | CON | MASS |
| Anoxic Biocell 1 | | | | |
| Flow | | | 400 gpm | 4,800,000 #/d |
| BOD | | | 225 mg/l | 1080 #/d |
| NH$_3$—N | | | 135 mg/l | 650 #/d |
| NO$_3$—N | | | 5 mg/l | 24 #/d |
| Aerobic Biocell 1 | | | | |
| Flow | 300 gpm | 3,600,000 #/d | 100 gpm | 1,200,000 #/d |
| BOD | 50 mg/l | 180 #/d | 50 mg/l | 60 #/d |
| NH$_3$—N | 14 mg/l | 13.5 #/d | 13.5 mg/l | 16.2 #/d |
| NO$_3$—N | 121 mg/l | 436 #/d | 121 mg/l | 145 #/d |
| Anoxic Biocell 2 | | | | |
| Flow | | | 400 gpm | 4,800,000 #/d |
| BOD | | | 4 mg/l | 18.0 #/d |
| NH$_3$—N | | | 3.7 mg/l | 18.0 #/d |
| NO$_3$—N | | | 1.7 mg/l | 8.1 #/d |
| Aerobic Biocell 2 | | | | |
| Flow | 300 gpm | 3,600,000 #/d | 100 gpm | 1,200,000 #/d |
| BOD | 2 mg/l | 2 #/d | 2 mg/l | 2 #/d |
| NH$_3$—N | 0.4 mg/l | 1/4 #/d | 0.4 mg/l | 0.5 #/d |
| NO$_3$—N | 5.0 mg/l | 18 #/d | 5.0 mg/l | 6 #/d |

TABLE 5

Anoxic/Anerobic/Aerobic/Anoxic/Aerobic with 300%/100% Aerobic return to Anoxic and Alternating Aerobic/Anoxic Biooxidation Recycle

| | RAW | | RECYCLE | | TOTAL | |
|---|---|---|---|---|---|---|
| | CON | MASS | CON | MASS | CON | MASS |
| Anoxic Biocell 1 | | | | | | |
| Flow | 100 gpm | 1,200,000 #/d | 300 gpm | 3,600,000 #/d | 400 | 4,800,000 #/d |
| BOD | 3,000 mg/l | 3600 #/d | 50 mg/l | 180 #/d | 787 mg/l | 3,730 #/d |
| NH$_3$—N | 500 mg/l | 600 #/d | 14 mg/l | 50 #/d | 135 mg/l | 650 #/d |
| NO$_3$—N | 0 | 0 | 16.5 mg/l | 225 #/d | 47 mg/l | 225 #/d |
| Aerobic Biocell 1 | | | | | | |
| Flow | | | | | 400 gpm | 4,800,000 #/d |
| BOD | | | | | 225 mg/l | 1080 #/d |

TABLE 5-continued

Anoxic/Anerobic/Aerobic/Anoxic/Aerobic with 300%/100% Aerobic return to Anoxic and Alternating Aerobic/Anoxic Biooxidation Recycle

| | | | | | | | |
|---|---|---|---|---|---|---|---|
| NH$_3$—N | | | | | | 135 mg/l | 650 #/d |
| NO$_3$—N | | | | | | 2.5 mg/l | 12 #/d |
| Anoxic Biocell 2 | | | | | | | |
| Flow | 100 gpm | 1,200,000 #/d | 100 gpm | 1,200,000 #/d | 200 gpm | 2,400,000 #/d | |
| BOD | 50 mg/l | 60 #/d | 2 mg/l | 2 #/d | 26 mg/l | 62 #/d | |
| NH$_3$—N | 13.5 mg/l | 16.2 #/d | 0.7 mg/l | 0.8 #/d | 7 mg/l | 17.0 #/d | |
| NO$_3$—N | 62.5 mg/l | 75 #/d | 4.0 mg/l | 4.8 #/d | 3.2 mg/l | 77 #/d | |
| Aerobic Biocell 2 | | | | | | | |
| Flow | | | | | 200 gpm | 2,400,000 #/d | |
| BOD | | | | | 4 mg/l | 10 #/d | |
| NH$_3$—N | | | | | 7 mg/l | 17.2 #/d | |
| NO$_3$—N | | | | | 1.6 mg/l | 3.8 #/d | |

| | RECYCLE | | OUT | |
|---|---|---|---|---|
| | CON | MASS | CON | MASS |
| Anoxic Biocell 1 | | | | |
| Flow | | | 400 gpm | 4,800,000 #/d |
| BOD | | | 225 mg/l | 1080 #/d |
| NH$_3$—N | | | 135 mg/l | 650 #/d |
| NO$_3$—N | | | 5 mg/l | 24 #/d |
| Aerobic Biocell 1 | | | | |
| Flow | 300 gpm | 3,600,000 #/d | 100 gpm | 1,200,000 #/d |
| BOD | 50 mg/l | 18 #/d | 5 mg/l | 6 #/d |
| NH$_3$—N | 13.5 mg/l | 50 #/d | 13.5 mg/l | 16.2 #/d |
| NO$_3$—N | 62.5 mg/l | 468 #/d | 130 mg/l | 156 #/d |
| Anoxic Biocell 2 | | | | |
| Flow | | | 400 gpm | 4,800,000 #/d |
| BOD | | | 225 mg/l | 1080 #/d |
| NH$_3$—N | | | 135 mg/l | 650 #/d |
| NO$_3$—N | | | 5 mg/l | 24 #/d |
| Aerobic Biocell 2 | | | | |
| Flow | 100 gpm | 3,600,000 #/d | 100 gpm | 1,200,000 #/d |
| BOD | 2 mg/l | 2 #/d | 2 mg/l | 2 #/d |
| NH$_3$—N | 0.7 mg/l | 1 #/d | 0.7 mg/l | 1 #/d |
| NO$_3$—N | 4.0 mg/l | 5.0 #/d | 4.0 mg/l | 5.0 #/d |

TABLE 6

Anoxic/Aerobic/Aerobic/Anoxic/Aerobic with 300%/300% Aerobic return to Anoxic and Alternating Aerobic/Anoxic Biooxidation Recycle

| | RAW | | RECYCLE | | TOTAL | |
|---|---|---|---|---|---|---|
| | CON | MASS | CON | MASS | CON | MASS |
| Anoxic Biocell 1 | | | | | | |
| Flow | 100 gpm | 1,200,000 #/d | 300 gpm | 3,600,000 #/d | 400 | 4,800,000 #/d |
| BOD | 3,000 mg/l | 3,600 #/d | 50 mg/l | 180 #/d | 787 mg/l | 3,730 #/d |
| NH$_3$—N | 500 mg/l | 600 #/d | 14 mg/l | 50 #/d | 135 mg/l | 650 #/d |
| NO$_3$—N | 0 | 0 | 62.5 mg/l | 225 #/d | 47 mg/l | 225 #/d |
| Aerobic Biocell 1 | | | | | | |
| Flow | | | | | 400 gpm | 4,800,000 #/d |
| BOD | | | | | 225 mg/l | 1080 #/d |
| NH$_3$—N | | | | | 135 mg/l | 650 #/d |
| NO$_3$—N | | | | | 2.5 mg/l | 12 #/d |
| Anoxic Biocell 2 | | | | | | |
| Flow | 100 gpm | 1,200,000 #/d | 300 gpm | 3,600,000 #/d | 400 gpm | 4,800,000 #/d |
| BOD | 50 mg/l | 60 #/d | 2 mg/l | 2 #/d | 26 mg/l | 62 #/d |

TABLE 6-continued

Anoxic/Aerobic/Aerobic/Anoxic/Aerobic with 300%/300% Aerobic return to Anoxic and Alternating Aerobic/Anoxic Biooxidation Recycle

| NH$_3$—N | 13.5 mg/l | 16.2 #/d | 0.7 mg/l | 0.8 #/d | 3.6 mg/l | 17.0 #/d |
|---|---|---|---|---|---|---|
| NO$_3$—N | 62.5 mg/l | 75 #/d | 2.5 mg/l | 9.0 #/d | 17.8 mg/l | 85.8 #/d |
| Aerobic Biocell 2 | | | | | | |
| Flow | | | | | 400 gpm | 4,800,000 #/d |
| BOD | | | | | 4 mg/l | 10 #/d |
| NH$_3$—N | | | | | 3.6 mg/l | 17.2 #/d |
| NO$_3$—N | | | | | 0.9 mg/l | 4.3 #/d |

|  | RECYCLE || OUT ||
|---|---|---|---|---|
|  | CON | MASS | CON | MASS |
| Anoxic Biocell 1 | | | | |
| Flow | | | 400 gpm | 4,800,000 #/d |
| BOD | | | 225 mg/l | 1080 #/d |
| NH$_3$—N | | | 135 mg/l | 650 #/d |
| NO$_3$—N | | | 2.5 mg/l | 12 #/d |
| Aerobic Biocell 1 | | | | |
| Flow | 300 gpm | 3,600,000 #/d | 100 gpm | 1,200,000 #/d |
| BOD | 50 mg/l | 180 #/d | 50 mg/l | 60 #/d |
| NH$_3$—N | 13.5 mg/l | 50 #/d | 13.5 mg/l | 16.2 #/d |
| NO$_3$—N | 62.5 mg/l | 234 #/d | 62.5 mg/l | 75 #/d |
| Anoxic Biocell 2 | | | | |
| Flow | | | 400 gpm | 4,800,000 #/d |
| BOD | | | 4 mg/l | 10 #/d |
| NH$_3$—N | | | 3.6 mg/l | 17.2 #/d |
| NO$_3$—N | | | 0.9 mg/l | 4.3 #/d |
| Aerobic Biocell 2 | | | | |
| Flow | 300 gpm | 3,600,000 #/d | 100 gpm | 1,200,000 #/d |
| BOD | 2 mg/l | 2 #/d | 2 mg/l | 2 #/d |
| NH$_3$—N | 0.3 mg/l | 1 #/d | 0.3 mg/l | 1 #/d |
| NO$_3$—N | 2.5 mg/l | 9 #/d | 2.5 mg/l | 3 #/d |

TABLE 7

Anoxic/Anerobic/Aerobic/Anoxic/Aerobic/Anoxic/Aerobic with 300%/100% Aerobic return to Anoxic

|  | RAW || RECYCLE || TOTAL ||
|---|---|---|---|---|---|---|
|  | CON | MASS | CON | MASS | CON | MASS |
| Anoxic Biocell 1 | | | | | | |
| Flow | 100 gpm | 1,200,000 #/d | 300 gpm | 3,600,000 #/d | 0 | 4,800,000 #/d |
| BOD | 3,000 mg/l | 3,600 #/d | 50 mg/l | 180 #/d | 787 mg/l | 3.730 #/d |
| NH$_3$—N | 500 mg/l | 600 #/d | 14 mg/l | 50 #/d | 135 mg/l | 650 #/d |
| NO$_3$—N | 0 | 0 | 125 mg/l | 468 #/d | 94 mg/l | 468 #/d |
| Aerobic Biocell 1 | | | | | | |
| Flow | | | | | 400 gpm | 4,800,000 #/d |
| BOD | | | | | 225 mg/l | 1080 #/d |
| NH$_3$—N | | | | | 135 mg/l | 650 #/d |
| NO$_3$—N | | | | | 5 mg/l | 24 #/d |
| Anoxic Biocell 2 | | | | | | |
| Flow | 100 gpm | 1,200,000 #/d | 100 gpm | 1,200,000 #/d | 200 gpm | 2,400,000 #/d |
| BOD | 50 mg/l | 60 #/d | 2 mg/l | 2 #/d | 26 mg/l | 62 #/d |
| NH$_3$—N | 13.5 mg/l | 16.2 #/d | 0.7 mg/l | 0.8 #/d | 7.1 mg/l | 17.0 #/d |
| NO$_3$—N | 121 mg/l | 145 #/d | 9.0 mg/l | 10.8 #/d | 65 mg/l | 156 #/d |
| Aerobic Biocell 2 | | | | | | |
| Flow | | | | | 200 gpm | 2,400,000 #/d |
| BOD | | | | | 4 mg/l | 10 #/d |
| NH$_3$—N | | | | | 7.1 mg/l | 17 #/d |
| NO$_3$—N | | | | | 3 mg/l | 7 #/d |

TABLE 7-continued

Anoxic/Anerobic/Aerobic/Anoxic/Aerobic/Anoxic/Aerobic with 300%/100% Aerobic return to Anoxic Anoxic Biocell 3

| | | | | | | | |
|---|---|---|---|---|---|---|---|
| Flow | 100 gpm | 1,200,000 #/d | 100 gpm | 1,200,000 #/d | 200 gpm | 2,400,000 #/d | |
| BOD | 2 mg/l | 2 #/d | | | | | |
| $NH_3$—N | 0.7 mg/l | 0.8 #/d | 0.035 mg/l | 0.042 #/d | 0.35 mg/l | 0.842 #/d | |
| $NO_3$—N | 9.0 mg/l | 10.8 #/d | 0.24 mg/l | 0.27 #/d | 4.62 mg/l | 11.07 #/d | |

Aerobic Biocell 3

| | | |
|---|---|---|
| Flow | 200 gpm | 2,400,000 #/d |
| BOD | | |
| $NH_3$—N | 0.35 mg/l | 0.842 #/d |
| $NO_3$—N | 0.23 mg/l | 0.55 #/d |

| | RECYCLE | | OUT | |
|---|---|---|---|---|
| | CON | MASS | CON | MASS |
| Anoxic Biocell 1 | | | | |
| Flow | | | 400 gpm | 4,800,000 #/d |
| BOD | | | 225 mg/l | 1080 #/d |
| $NH_3$—N | | | 135 mg/l | 650 #/d |
| $NO_3$—N | | | 5 mg/l | 24 #/d |
| Aerobic Biocell 1 | | | | |
| Flow | 300 gpm | 3,600,000 #/d | 100 gpm | 1,200,000 #/d |
| BOD | 50 mg/l | 180 #/d | 50 mg/l | 60 #/d |
| $NH_3$—N | 13.5 mg/l | 50 #/d | 13.5 mg/l | 16.2 #/d |
| $NO_3$—N | 121 mg/l | 436 #/d | 121 mg/l | 145 #/d |
| Anoxic Biocell 2 | | | | |
| Flow | | | 200 gpm | 2,400,000 #/d |
| BOD | | | 4 mg/l | 10 #/d |
| $NH_3$—N | | | 7.1 mg/l | 17.0 #/d |
| $NO_3$—N | | | 3 mg/l | 7 #/d |
| Aerobic Biocell 2 | | | | |
| Flow | 100 gpm | 1,200,000 #/d | 100 gpm | 1,200,000 #/d |
| BOD | 2 mg/l | 2 #/d | 2 mg/l | 2 #/d |
| $NH_3$—N | 0.7 mg/l | 0.8 #/d | 0.7 mg/l | 0.8 #/d |
| $NO_3$—N | 9.0 mg/l | 10.8 #/d | 9.0 mg/l | 10.8 #/d |
| Anoxic Biocell 3 | | | | |
| Flow | | | 200 gpm | 2,400,000 #/d |
| BOD | | | | |
| $NH_3$—N | | | 0.35 mg/l | 0.842 #/d |
| $NO_3$—N | | | 0.23 mg/l | 0.55 #/d |
| Aerobic Biocell 3 | | | | |
| Flow | 100 gpm | 1,200,000 #/d | 100 gpm | 1,200,000 #/d |
| BOD | | | | |
| $NH_3$—N | 0.035 mg/l | 0.042 #/d | 0.035 mg/l | 0.042 #/d |
| $NO_3$—N | 0.23 mg/l | 0.27 #/d | 0.23 mg/l | 0.27 #/d |

TABLE 8

Anoxic/Anerobic/Aerobic/Anoxic/Aerobic/Anoxic/Aerobic with 300%/300% Aerobic return to Anoxic

| | RAW | | RECYCLE | | TOTAL | |
|---|---|---|---|---|---|---|
| | CON | MASS | CON | MASS | CON | MASS |
| Anoxic Biocell 1 | | | | | | |
| Flow | 100 gpm | 1,200,000 #/d | 300 gpm | 3,600,000 #/d | 400 gpm | 4,800,000 #/d |
| BOD | 3,000 mg/l | 3,600 #/d | 50 mg/l | 180 #/d | 787 mg/l | 3,730 #/d |
| $NH_3$—N | 500 mg/l | 600 #/d | 14 mg/l | 50 #/d | 135 mg/l | 650 #/d |
| $NO_3$—N | 0 | 0 | 125 mg/l | 468 #/d | 93.76 mg/l | 468 #/d |
| Aerobic Biocell 1 | | | | | | |
| Flow | | | | | 400 gpm | 4,800,000 #/d |
| BOD | | | | | 225 mg/l | 1080 #/d |
| $NH_3$—N | | | | | 135 mg/l | 650 #/d |
| $NO_3$—N | | | | | 5 mg/l | 24 #/d |

TABLE 8-continued

Anoxic/Anerobic/Aerobic/Anoxic/Aerobic/Anoxic/Aerobic with 300%/300% Aerobic return to Anoxic Anoxic Biocell 2

| | | | | | | | |
|---|---|---|---|---|---|---|---|
| Flow | 100 gpm | 1,200,000 #/d | 300 gpm | 3,600,000 #/d | 400 gpm | 4,800,000 #/d |
| BOD | 50 mg/l | 60 #/d | 2 mg/l | 2 #/d | 26 mg/l | 62 #/d |
| NH$_3$—N | 13.5 mg/l | 16.2 #/d | 0.4 mg/l | 1.4 #/d | 3.7 mg/l | 18.0 #/d |
| NO$_3$—N | 121 mg/l | 145 #/d | 5.0 mg/l | 18 #/d | 3.4 mg/l | 163 #/d |

Aerobic Biocell 2

| | | | | | | | |
|---|---|---|---|---|---|---|---|
| Flow | | | | | 400 gpm | 4,800,000 #/d |
| BOD | | | | | 4 mg/l | 10 #/d |
| NH$_3$—N | | | | | 3.7 mg/l | 18 #/d |
| NO$_3$—N | | | | | 1.7 mg/l | 8.1 #/d |

Anoxic Biocell 3

| | | | | | | | |
|---|---|---|---|---|---|---|---|
| Flow | 100 gpm | 1,200,000 #/d | 300 gpm | 3,600,000 #/d | 400 gpm | 4,800,000 #/d |
| BOD | 2 mg/l | 2 #/d | | | 0.5 mg/l | 2.0 #/d |
| NH$_3$—N | 0.4 mg/l | 0.5 #/d | 0.011 mg/l | 0.053 #/d | 0.11 mg/l | 0.55 #/d |
| NO$_3$—N | 5.0 mg/l | 6.0 #/d | 0.18 mg/l | 0.645 #/d | 1.38 mg/l | 6.645 #/d |

Aerobic Biocell 3

| | | |
|---|---|---|
| Flow | 400 gpm | 4,800,000 #/d |
| BOD | | |
| NH$_3$—N | 0.11 mg/l | 0.55 #/d |
| NO$_3$—N | 0.06 mg/l | 0.31 #/d |

| | RECYCLE | | OUT | |
|---|---|---|---|---|
| | CON | MASS | CON | MASS |
| Anoxic Biocell 1 | | | | |
| Flow | | | 400 gpm | 4,800,000 #/d |
| BOD | | | 225 mg/l | 1080 #/d |
| NH$_3$—N | | | 135 mg/l | 650 #/d |
| NO$_3$—N | | | 5 mg/l | 24 #/d |
| Aerobic Biocell 1 | | | | |
| Flow | 300 gpm | 3,600,000 #/d | 100 gpm | 1,200,000 #/d |
| BOD | 50 mg/l | 180 #/d | 50 mg/l | 60 #/d |
| NH$_3$—N | 13.5 mg/l | 50 #/d | 13.5 mg/l | 16.2 #/d |
| NO$_3$—N | 121 mg/l | 436 #/d | 121 mg/l | 145 #/d |
| Anoxic Biocell 2 | | | | |
| Flow | | | 400 gpm | 4,800,000 #/d |
| BOD | | | 4 mg/l | 10 #/d |
| NH$_3$—N | | | 3.7 mg/l | 18.0 #/d |
| NO$_3$—N | | | 1.7 mg/l | 8.1 #/d |
| Aerobic Biocell 2 | | | | |
| Flow | 300 gpm | 3,600,000 #/d | 100 gpm | 1,200,000 #/d |
| BOD | 2 mg/l | 2 #/d | 2 mg/l | 2 #/d |
| NH$_3$—N | 0.4 mg/l | 1.4 #/d | 0.4 mg/l | 0.5 #/d |
| NO$_3$—N | 5.0 mg/l | 18 #/d | 5.0 mg/l | 6 #/d |
| Anoxic Biocell 3 | | | | |
| Flow | | | 400 gpm | 4,800,000 #/d |
| BOD | | | | |
| NH$_3$—N | | | 0.11 mg/l | 0.55 #/d |
| NO$_3$—N | | | 0.06 mg/l | 0.31 #/d |
| Aerobic Biocell 3 | | | | |
| Flow | 300 gpm | 3,600,000 #/d | 100 gpm | 1,200,000 #/d |
| BOD | | | | |
| NH$_3$—N | 0.011 mg/l | 0.053 #/d | 0.011 mg/l | 0.013 #/d |
| NO$_3$—N | 0.18 mg/l | 0.646 #/d | 0.18 mg/l | 0.216 #/d |

TABLE 9

| | CLARIFIER EFFLUENT | | | | | | | | |
|---|---|---|---|---|---|---|---|---|---|
| | INFLUENT | | RECYCLE | | TOTAL | | RECYCLE | | EFFLENT |
| | CON | MASS | CON | MASS | CON | MASS | CON | MASS | CON | MASS |

Clarifier Effluent - Table 1 Anoxic/Anerobic/Aerobic with 300% Aerobic Return

| | | | | | | | | | | |
|---|---|---|---|---|---|---|---|---|---|---|
| Flow | 100 gpm | 1,200,000 #/d | | | | | | | 100 gpm | 1,200,000 #/d |
| BOD | 5 mg/l | 6 #/d | | | | | | | Nil | Nil |
| NH$_3$—N | 13.5 mg/l | 16.2 #/d | | | | | | | 13.5 mg/l | 16.2 #/d |
| NO$_3$—N | 130 mg/l | 156 #d | | | | | | | 13 mg/l | 15 #/d |

Clarifier Effluent - Table 2 Anoxic/Anerobic/Aerobic with 300% Aerobic Return and Alternating Anoxic/Aerobic Cycle

| | | | | | | | | | | |
|---|---|---|---|---|---|---|---|---|---|---|
| Flow | 100 gpm | 1,200,000 #/d | | | | | | | 100 gpm | 1,200,000 #/d |
| BOD | 5 mg/l | 6 #/d | | | | | | | 0 | 0 |
| NH$_3$—N | 13.5 mg/l | 16.2 #/d | | | | | | | 13.5 mg/l | 16.2 #/d |
| NO$_3$—N | 65 mg/l | 78 #/d | | | | | | | 6.5 mg/l | 7.8 #/d |

Clarifier Effluent - Table 3 Anoxic/Anerobic/Aerobic/Anoxic/Aerobic with 300%/100 Aerobic Return to Anoxic

| | | | | | | | | | | |
|---|---|---|---|---|---|---|---|---|---|---|
| Flow | 100 gpm | 1,200,000 #/d | | | | | | | 100 gpm | 4,800,000 #/d |
| BOD | 2 mg/l | 2 #/d | | | | | | | Nil | Nil |
| NH$_3$—N | 0.7 mg/l | 0.8 #/d | | | | | | | 0.7 mg/l | 0.8 #/d |
| NO$_3$—N | 9.0 mg/l | 10.8 #/d | | | | | | | 0.9 mg/l | 1.1 #/d |

Clarifier Effluent - Table 4 Anoxic/Anerobic/Aerobic/Anoxic/Anerobic 300%/300 Aerobic Return to Anoxic

| | | | | | | | | | | |
|---|---|---|---|---|---|---|---|---|---|---|
| Flow | 100 gpm | 1,200,000 #/d | | | | | | | 100 gpm | 1,200,000 #/d |
| BOD | 2 mg/l | 2 #/d | | | | | | | Nil | Nil |
| NH$_3$—N | 0.4 mg/l | 0.5 #/d | | | | | | | 0.4 mg/l | 0.5 #/d |
| NO$_3$—N | 5.0 mg/l | 6 #/d | | | | | | | 0.5 mg/l | 0.6 #/d |

Clarifier Effluent - Table 5 Anoxic/Anerobic/Aerobic/Anoxic/Aerobic 300%/100% Aerobic Return to Anoxic and Alternating Aerobic/Anoxic Biooxidation Recycle

| | | | | | | | | | | |
|---|---|---|---|---|---|---|---|---|---|---|
| Flow | 100 gpm | 1,200,000 #/d | | | | | | | 100 gpm | 1,200,000 #/d |
| BOD | 2 mg/l | 2 #/d | | | | | | | Nil | Nil |
| NH$_3$—N | 0.7 mg/l | 1 #/d | | | | | | | 0.7 mg/l | 1.00 #/d |
| NO$_3$—N | 4.0 mg/l | 5.0 #/d | | | | | | | 0.4 mg/l | 0.5 #/d |

Clarifier Effluent - Table 6 Anoxic/Anerobic/Aerobic/Anoxic/Aerobic 300%/300% Aerobic Return to Aerobic and Alternating Aerobic/Anoxic Biooxidation Recycle

| | | | | | | | | | | |
|---|---|---|---|---|---|---|---|---|---|---|
| Flow | 100 gpm | 1,200,000 #/d | | | | | | | 100 gpm | 1,200,000 #/d |
| BOD | 2 mg/l | 2 #/d | | | | | | | Nil | Nil |
| NH$_3$—N | 0.3 mg/l | 1 #/d | | | | | | | 0.3 mg/l | 1 #/d |
| NO$_3$—N | 2.5 mg/l | 3.0 #/d | | | | | | | 0.25 mg/l | 0.3 #/d |

What is claimed is:

1. An apparatus for treating wastewater, comprising:
a supply of wastewater;
means downstream from said supply of wastewater for separating large suspended solids from said wastewater to produce a wastewater fraction for treatment and a solids fraction;
at least one anoxic biological culture downstream from said separating means;
at least one anaerobic biological culture downstream from said at least one anoxic culture to remove organic material from said wastewater in the absence of exogenous oxygen;
at least one aerobic biological culture downstream from said at least one anaerobic culture to remove organic material from said wastewater in the presence of exogenous oxygen;
at least one means for supplying exogenous oxygen to said at least one aerobic culture;
means for determining the level of oxygen in said at least one aerobic culture;
means for turning off said means for supplying exogenous oxygen when said oxygen level achieves a pre-set level for a pre-set period of time;
means for turning on said means for supplying exogenous oxygen when said oxygen level achieves a different pre-set level, wherein said wastewater in said at least one aerobic culture cycles from aerobic conditions to anoxic conditions and from anoxic conditions to aerobic conditions;
means for recycling at least a portion of said wastewater from at least one of said at least one aerobic culture to at least one of said at least one anoxic culture
means downstream from said at least one aerobic culture for clarifying said wastewater from said at least one aerobic culture to produce clarified wastewater; wherein said clarifying means comprises at least one anoxic sub-zone; and
means for recycling at least a portion of said clarified wastewater to said supply of wastewater.

2. The apparatus of claim 1, wherein said means for determining the level of oxygen in said at least one aerobic culture comprises laboratory testing.

3. The apparatus of claim 1, wherein said means for determining the level of oxygen in said at least one aerobic culture comprises a probe.

4. The apparatus of claim 1, wherein said means for turning on and turning off said means for supplying exogenous oxygen to said at least one aerobic culture comprises a timer.

5. The apparatus of claim 1, further comprising means for adjusting the pH of said wastewater.

6. The apparatus of claim 1, further comprises means for mixing said anaerobic culture with said wastewater.

7. The apparatus of claim 1, wherein said at least one anaerobic culture reduces the amount of organic components form approximately 3,000 to 6,000 mg/l to approximately 200 to 1,000 mg/l.

8. The apparatus of claim 1, wherein said means for supplying exogenous oxygen to said at least one aerobic culture is shut off at an oxygen level of between approximately 2.0 mg/l to approximately 5.0 mg/l.

9. The apparatus of claim 1, wherein said means for supplying exogenous oxygen to said at least one aerobic culture is shut off for approximately ten minutes to ten hours.

10. The apparatus of claim 1, wherein the COD content of said wastewater is reduced to in the range of approximately 97% to 99% and the nitrogen content of said wastewater is reduced to in the range of approximately 70% to 99%.

11. The apparatus of claim 1, wherein the COD content of said wastewater is reduced to approximately 1 to 50 mg/l and the nitrogen content is reduced to approximately 1 to 120 mg/l.

12. An apparatus for treating wastewater, comprising:

a supply of wastewater;

means downstream from said supply of wastewater for separating large suspended solids from said wastewater to produce a wastewater fraction for treatment and a solids fraction;

at least one anoxic biological culture downstream from said separating means;

at least one anaerobic biological culture downstream from said at least one anoxic culture to remove organic material from said wastewater in the absence of exogenous oxygen;

at least one aerobic biological culture downstream from said at least one anaerobic culture to remove organic material from said wastewater in the presence of exogenous oxygen;

at least one means for supplying exogenous oxygen to said at least one aerobic culture;

means for determining the level of oxygen in said at least one aerobic culture;

means for turning off said means for supplying exogenous oxygen when said oxygen level achieves a pre-set level for a pre-set period of time;

means for turning on said means for supplying exogenous oxygen when said oxygen level achieves a different pre-set level, wherein said wastewater in said at least one aerobic culture cycles from aerobic conditions to anoxic conditions and from anoxic conditions to aerobic conditions;

means for recycling at least a portion of said wastewater from at least one of said at least one aerobic culture to at least one of said at least one anoxic culture means downstream from said at least one aerobic culture for clarifying said wastewater from said at least one aerobic culture to produce clarified wastewater; wherein said clarifying means comprises at least one anoxic sub-zone; and means for recycling at least a portion of said clarified wastewater to said supply of wastewater;

wherein said at least one anaerobic culture reduces the amount of organic components from approximately 3,000 to 6,000 mg/l to approximately 200 to 1,000 mg/l; and wherein said means for supplying exogenous oxygen to said at least one aerobic culture is shut off at an oxygen level of between approximately 2.0 mg/l to approximately 5.0 mg/; and wherein said means for supplying exogenous oxygen to said at least one aerobic culture is shut off for cycles of approximately ten minutes to ten hours; and wherein the COD content of said wastewater is reduced to in the range of approximately 97% to 99% and the nitrogen content of said wastewater is reduced to in the range of approximately 70% to 99%; and wherein the COD content of said wastewater is reduced to approximately 1 to 50 mg/l and the nitrogen content is reduced to approximately 1 to 120 mg/l.

* * * * *

UNITED STATES PATENT AND TRADEMARK OFFICE
CERTIFICATE OF CORRECTION

PATENT NO. : 6,054,044
DATED : April 25, 2000
INVENTOR(S) : Hoffland, et al.

It is certified that error appears in the above-identified patent and that said Letters Patent are hereby corrected as shown below:

In claim 12, line 30 please insert --cycles of-- after "for."
In claim 12, line 40 please insert --to-- after "reduces."

Signed and Sealed this

Twenty-second Day of May, 2001

Attest:

NICHOLAS P. GODICI

*Attesting Officer*     *Acting Director of the United States Patent and Trademark Office*